(12) United States Patent
Hohn et al.

(10) Patent No.: US 7,701,852 B1
(45) Date of Patent: Apr. 20, 2010

(54) METHOD FOR ANALYZING PERFORMANCE OF A NETWORK THROUGH MEASURING AND REPORTING DELAY IN ROUTING DEVICES

(75) Inventors: Nicolas Hohn, Balwyn (AU); Darryl Neil Veitch, Victoria (AU); Konstantina Papagiannaki, Cambridge (GB)

(73) Assignee: Sprint Communications Company L.P., Overland Park, KS (US)

( * ) Notice: Subject to any disclaimer, the term of this patent is extended or adjusted under 35 U.S.C. 154(b) by 1145 days.

(21) Appl. No.: 10/926,672

(22) Filed: Aug. 26, 2004

(51) Int. Cl.
*H04L 12/26* (2006.01)
*H04L 12/56* (2006.01)

(52) U.S. Cl. .................. 370/232; 370/252; 370/401; 370/412

(58) Field of Classification Search ......... 370/229–232, 370/252, 253, 389, 400, 401, 412, 413, 415, 370/417
See application file for complete search history.

(56) References Cited

U.S. PATENT DOCUMENTS

| | | | | |
|---|---|---|---|---|
| 4,320,500 | A * | 3/1982 | Barberis et al. ............. | 370/413 |
| 5,428,616 | A * | 6/1995 | Field et al. ................. | 370/253 |
| 5,570,346 | A * | 10/1996 | Shur ........................... | 370/231 |
| 5,668,951 | A * | 9/1997 | Jain et al. .................... | 709/235 |
| 5,793,976 | A * | 8/1998 | Chen et al. .................. | 709/224 |
| 5,926,461 | A * | 7/1999 | Habermann et al. ......... | 370/253 |
| 6,687,223 | B1 * | 2/2004 | Sajadieh et al. ............. | 370/230 |
| 6,778,493 | B1 * | 8/2004 | Ishii ............................ | 370/229 |
| 7,035,210 | B2 * | 4/2006 | Walles ......................... | 370/229 |
| 7,068,660 | B2 * | 6/2006 | Suni ........................... | 370/395.2 |
| 7,088,677 | B1 * | 8/2006 | Burst, Jr. ..................... | 370/229 |
| 7,145,871 | B2 * | 12/2006 | Levy et al. .................. | 370/229 |
| 2003/0031185 | A1 * | 2/2003 | Kikuchi et al. .............. | 370/400 |
| 2003/0202528 | A1 * | 10/2003 | Eckberg ....................... | 370/412 |

OTHER PUBLICATIONS

Donnelly, Stephen F., "High Precision Timing In Passive Measurements of Data Networks"; Jun. 12, 2002; A thesis submitted in partial fulfillment of the requirements for the degree of Doctor of Philosophy at the University of Waikato, Hamilton, New Zealand.
Papagiannaki, Konstantina, et al., "Origins of Microcongestion in an Access Router", Proc. Passive and Active Measurement Workshop, Antibes, Juan Les Pins, France, 2004.
Papagiannaki, Konstantina, et al., "Network Performance Monitoring at Small Time Scales", Proc. ACM Internet Measurement Conference, Miami, Oct. 2003, pp. 295-300.
Fraleigh, Chuck, et al., "Packet-Level Traffic Measurements from the Sprint IP Backbone", Proc. Of Passive and Active Measurement Workshop, 2001.
Pappagiannaki, Konstantina, et al., "Analysis of Measured Single-Hop Delay from an Operational Backbone Network", Proc. IEEE Infocom, New York, 2002.

(Continued)

*Primary Examiner*—Aung S Moe
*Assistant Examiner*—Kerri M Rose

(57) ABSTRACT

A method for analyzing performance of a network, e.g., a communications network, is provided. In one embodiment, the method includes measuring detailed information relating to packet delays in routers and reporting the gathered information, for instance, using Simple Network Management Protocol (SNMP). The method hereof provides insight into through-router delays, such insights being particularly useful, for instance, for network providers who may have to comply with allowable delay statistics values across the domains they control.

29 Claims, 31 Drawing Sheets

OTHER PUBLICATIONS

Keshav, S., et al., "Issues and Trends in Router Design", Department of Computer Science, Cornell University, Ithaca, New York, IEE Communication Magazine, vol. 36, No. 5, pp. 144-151, 1998.

Addie, Ron, et al., "Performance Formulae for Queues with Gaussian Input", Proc. 16th International Teletraffic Congress, 1999.

* cited by examiner

METHOD FOR ANALYZING PERFORMANCE OF A NETWORK THROUGH MEASURING AND REPORTING DELAY IN ROUTING DEVICES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to analyzing performance of a network. More particularly, the present invention relates to measuring and reporting delay in routing devices, e.g., routers, and thereby providing a better understanding of data network performance. Still further, the present invention relates to capturing detailed information regarding packet delays within routing devices and reporting such information using existing protocols.

BACKGROUND OF THE INVENTION

Internet protocol networks, often referred to as IP networks, are complex systems used by telecommunication service providers to provide high bandwidth transmission of data packets, often over long distances. Data transmitted over an IP network may be Internet related data, but may also be data for any other purpose, such as voice telephone calls transmitted using voice over IP protocols.

An IP network comprises a plurality of high bandwidth links, such as high capacity fiber optic cables or, more typically, a bundle of high capacity fiber optic cables, connecting telecommunication equipment, such as routers. Routers and other equipment may be co-located in points of presence, often referred to as PoPs. Packets of data are transmitted from a first router to a second router over the intermediate link connecting the first and second routers. To transmit a data packet from an origin router in an IP network to the destination router, the data packet is transmitted in a series of "hops" from one router to the next until it reaches its destination. The node at which a packet begins is referred to as the origin node, with the final node being referred to as the destination node. At each router on the path, that router independently determines the shortest path route to the destination and transmits the packet on the next hop of that shortest path route. A measure of the total traffic on any link of the IP network may be obtained by measuring packets transmitted or received by the routers connected by that link, as each link joins two, and only two, routers. Accordingly, the total amount of traffic on a link over a given time period may be determined based upon the traffic transmitted and/or received by the routers on either end of that link, over the link. A variety of methods are currently used to measure such link utilization values, and other methods may be developed in the future.

End-to-end packet delay, that is, the delay between the origin node and the destination node, is an important metric to measure in networks, both from the network operator and application performance points of view. An important component of this delay is the time it takes for packets to traverse the different forwarding elements along the path. This is particularly important for network providers who may have Service Level Agreements (SLAs) specifying allowable values of delay statistics across the domains they control. A fundamental building block of the path delay experienced by packets in IP networks is the delay incurred when passing through a single IP router.

Although there have been many studies examining delay statistics measured at the edges of the network, very few have been able to report with any degree of authority on what actually occurs at the switching elements. For instance, in one study, an analysis of single hop delay on an IP backbone network was presented and different delay components were isolated. See, *Analysis of Measured Single-Hop Delay from an Operational Back Bone Network*, K. Papagiannaki et al., Proc. IEEE Infocom, New York (2002). However, since the measurements in this study were limited to a subset of the router interfaces, only samples of the delays experienced by some packets on some links were identified. Single hop delays obtained for a router having only one input link and one output link, which links were of the same speed, have also been examined. However, this atypical operating scenario leads to the through-router delays being extremely low and not indicative of behavior in practical applications as the internal queueing with such an experimental setup is extremely limited.

Additionally, models have been proposed for inferring delays based solely on average link utilization. These methods, however, are fundamentally flawed as detailed statistics regarding the input traffic are not known. In fact, link utilization alone can be very misleading as a way of inferring packet delays. Suppose, for instance, that there is a group of back-to-back packets on a given output link of a store and forward-type router. That is, suppose that the packets follow each other on the link without gaps, i.e., the local link utilization is 100%. However, this does not imply that these packets have experienced large delays inside the router. They could very well be coming back-to-back from the input link with the same bandwidth as the output link. In this case, they would actually cross the router with minimum delay in the absence of cross-traffic.

To the inventors' knowledge, there have been no models constructed which provide for the measurement of delay within a router, referred to herein as "through-router delay", with useful accuracy.

Thus, it would be advantageous to provide a comprehensive picture of end-to-end router delay performance without making any assumptions on traffic statistics or router functionalities. Further, it would be desirable to investigate how packet delays occur inside the router, that is, to provide a physical model of the router delay performance. Still further, it would be advantageous to summarize and report delay statistics effectively using existing protocols.

SUMMARY OF THE INVENTION

The present invention provides methods for analyzing performance of a network, e.g., a communications network. In one embodiment, a method of the present invention includes measuring detailed information relating to packet delays in routers (referred to herein as "through-router" delay) and reporting the gathered information, for instance, using existing protocols. Methods in accordance with the present invention provide insight into through-router delays, such insights being particularly useful, for instance, for network providers who may have to comply with allowable delay statistics values across the domains they control. The various methods of the present invention may be used separately or together to analyze performance of an IP network.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
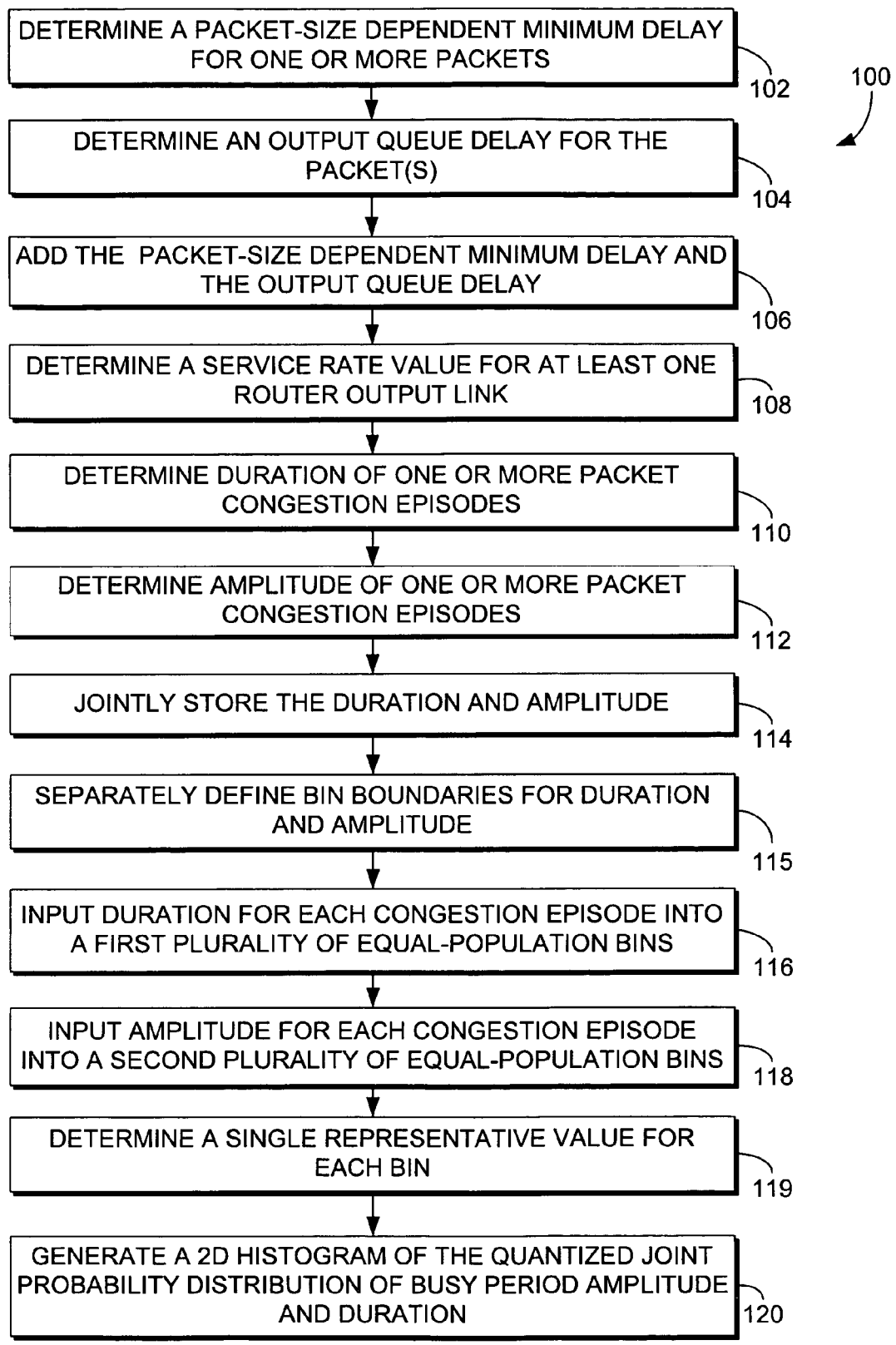
FIG. 1 is a schematic illustration of a method for analyzing performance of a network in accordance with an embodiment of the present invention.

The present invention provides a method for analyzing performance of a network, e.g., a communications network. More particularly, one embodiment of the present invention provides a method for measuring and reporting delay in routing devices and thereby providing a better understanding of data network performance. The particular embodiments described herein are intended in all respects to be illustrative rather than restrictive. Alternative embodiments will become apparent to those of ordinary skill in the art to which the present invention pertains without departing from its scope.

Based on the observations and analysis described in the following Examples, the present invention, in one embodiment, provides an approach for modeling through-router delay, that is, the time it takes for a packet to travel through the routing-device itself. The model indicates that for a given router output link, the minimum excess (i.e., excluding service time) packet transit time between each input link and an output link may be measured. These values depend only on the hardware involved, not the type of traffic, and therefore may be tabulated. Subsequently, the overall minimum packet transit time may be defined as the minimum transit time over all input links. Additionally, the IP bandwidth of the output link may be calculated by taking into account the different levels of packet encapsulation.

Subsequently, packet delays may be obtained by aggregating the input traffic corresponding to the given output link and feeding it to a simple two-stage model where packets first experience a minimum delay before entering a First In First Out (FIFO) queue. The two-stage model is more fully described below with reference to FIG. 8B. A model of a full router, as opposed to a single given output, may be obtained by putting together the models obtained for each output link.

Although simple, this model performs remarkably well, particularly where the router is lightly loaded and the output buffer is clearly the bottleneck. As more fully described below, it is expected that the model will continue to perform well even under heavier load where interactions in the front end become more pronounced, but not dominant.

In the experimental setup described hereinbelow, all packets crossing a particular router over a thirteen-hour period of time were captured and detailed statistics of their delays were presented. The measurements that were obtained allowed for the building of a physical model for router performance which provides that each packet experiences a minimum router processing time before entering a fluid output queue. Although simple, this model reproduces the router behavior with excellent accuracy. Additionally, the model takes into account through-router packet processing time which accounts for a significant portion of the overall packet delay and should not be neglected. Still further, the model establishes that both link and physical layer characteristics should be understood such that the appropriate bandwidth value may be used in calculating delay, as more fully described below.

Focusing directly on router performance, insights are provided into system busy periods, also referred to herein as "congestion episodes", as is an illustration of precisely how queues build up inside a router.

The actual magnitudes and temporal structure of delays on a subset of links which experienced significant congestion in the router under study, that is, mean utilization levels on the target output link ranging from $\rho=0.3$ to $\rho=0.7$, are reported. High utilization scenarios with significant delays are of the most interest, and yet are rare in today's backbone IP networks. From a measurement point of view, the present invention, in one embodiment, provides a comprehensive picture of end-to-end router delay performance. All analysis is based on empirical results and no assumptions on traffic statistics or router functionalities are made.

The data collected is subsequently used as a tool to investigate how packet delays occur inside a router. In other words, the data is used to provide a physical model of the router delay performance. It is confirmed that the prevailing assumption that the bottleneck of store-and-forward router architecture is in the output queues, and the commonly used fluid output queue model for the router is justified. Further, two refinements to the simple queue idea which lead to a model with excellent accuracy, close to the limits of time-stamping precision, are provided. The model focuses on datapath functions, performed at the hardware level for every IP datagram.

The insights gleaned from the data and the simplifications from the model are then combined to address the question of how delay statistics can be most effectively summarized and reported. Currently, the existing Simple Network Management Protocol (SNMP) focuses on reporting utilization statistics rather than delay. Although it is possible to gain insight into the duration and amplitude of congestion episodes through a multi-scale approach to utilization reporting, the connection between the two is complex and strongly dependent on the structure of traffic arriving to the router. See, *Network Performance Monitoring at Small Time Scales*, K. Papagiannaki et al., *Proc. ACM Internet Measurement Conference*, pp. 295-300, Miami (2003), the disclosure of which is incorporated by reference herein in its entirety. A new approach to measuring delay based on direct reporting of queue level statistics is provided. This is practically feasible as buffer levels are already made available to active queue management schemes implemented in modern routers. (Note, however, that active management was switched off in the router under study.) A computationally feasible way of recording the structure of congestion episodes and reporting them back via SNMP is provided. The selected statistics are rich enough to allow detailed metrics of congestion behavior to be estimated with reasonable accuracy. A key advantage is that a generically rich description is reported, without the need for any traffic assumptions.

With reference to the drawing figures in generally, and initially to FIG. 1 in particular, a schematic illustration of a method for analyzing performance of a network in accordance with an embodiment of the present invention is illustrated and designated generally by reference numeral 100. Initially, the through-router delay experienced by at least one packet traveling through at least one routing device, e.g., a router, in the network may be measured. To do so, a packet-size dependent minimum delay for the at least one packet may be determined as shown at block 102. Determination of the packet-size dependent minimum delay is more fully described below. Additionally, as shown at block 104, an output queue delay for the at least one packet may be determined. This determination is also more fully described below. Subsequently, as shown at block 106, the packet-size dependent minimum delay and the output queue delay may be added together to determine the delay experienced by the at least one packet.

In one embodiment of the method of the present invention, a service rate value for the at least one router may also be determined. This is illustrated at block 108 of FIG. 1. As more fully described below, the service rate value utilized may take into account both link transport protocol for the output link over which the at least one packet is to be served and characteristics of the output link physical layer.

Once the through-router delay experienced by each packet traveling through the at least one router is measured, information relating to the measured delay may be reported. In one embodiment, the measured delay may be reported using Simple Network Management Protocol, as more fully described below. To report delay information, the duration and amplitude of one or more congestion episodes (also referred to herein as "busy periods") may be determined. This is illustrated at blocks 110 and 112, respectively. Once determined, the duration and amplitude of each congestion episode may be jointly stored in one or more computer storage media. Computer storage media may include, without limitation, volatile and nonvolatile media, as well as removable and nonremovable media implemented in any method or technology for storage of information, such as computer readable instructions, data structures, program modules, or other data. In this regard, computer storage media may include, but is not limited to, RAM, ROM, EEPROM, flash memory or other memory technology, CD-ROM, digital versatile disks (DVDs), or other optical disk storage, magnetic cassettes, magnetic tape, magnetic disk storage, or other magnetic storage device, or any other medium which can be used to store the desired information and which may be accessed by a control server. Such computer storage media is known to those of ordinary skill in the art and, accordingly, is not further described herein.

Next, as shown at block 115, bin boundaries may be separately defined for each of duration and amplitude. A simple and natural way to do this is to select bin boundaries for duration and amplitude based on quantiles, i.e., on bin populations. For instance, an equal population scheme may be implemented, as more fully described below. Next, as shown at block 116, the determined duration for each congestion episode may be input or quantized into a first plurality of bins, as more fully described below. Additionally, a shown at block 118, the determined amplitude for each congestion episode may be input or quantized into a second plurality of bins. Once the durations and amplitudes for each congestion episode taking place in the router over a given period of time have been input, a single representative value for each bin may be determined, as shown at block 119. Next, a two-dimensional histogram of the quantized joint probability distribution of congestion episode durations and amplitudes may be generated using the single representative value for each bin that was determined at block 119. This is shown at block 120. The generated two-dimensional histogram may then be utilized to analyze performance of the network.

Each of the steps in the above-described method is more fully described in the following examples. It will be understood and appreciated by those of ordinary skill in the art that the following examples are provided by way of illustration only and are not intended to limit the present invention in any way.

EXAMPLES

Example 1

Router Architecture

A store-and-forward-type router implementing Virtual Output Queues (VOQs) at the input links was utilized to measure and analyze through-router delays. It will be understood and appreciated by those of ordinary skill in the art, however, that this particular router is merely one example of a router architecture that is suitable for use with the present invention and is not intended to limit the present invention in any way. Store-and-forward-type routers are essentially composed of a switching fabric controlled by a centralized scheduler and one or more interfaces, also known as linecards. Each linecard typically controls two links: one input link and one output link.

A typical datapath followed by a packet crossing a store-and-forward-type router is as follows: When a packet arrives at the input link of a linecard, its destination address is looked up in a forwarding table. This does not occur, however, until the packet completely leaves the input link and fully arrives in the linecard's memory. This is the "store" part of "store-and-forward". Virtual Output Queuing refers to the fact that each input interface has a separate First In First Out (FIFO) queue dedicated to each output interface. The packet is stored in the appropriate queue of the input interface where it is decomposed into fixed length cells. When the packet reaches the head of the line, it is transmitted through the switching fabric cell-by-cell to its output interface, possibly interleaved with competing cells from VOQs at other input interfaces dedicated to the same output interface. The packet is then reassembled before being handed to the output link scheduler. This is the "forward" part of "store-and-forward". The packet might then experience queuing before being serialized without interruption onto the output link. In queuing terminology, the packet is "served" at a rate equal to the bandwidth of the output link, and the output process is of the fluid type because the packet flows out gradually instead of leaving in an instant.

It should be noted that in a store-and-forward-type router, a packet might be queued both at the input interface and the output link scheduler. However, in practice, the switch fabric is typically over-provisioned and therefore very little queuing occurs at the input queues.

Example 2

Layer Overheads

Each interface of the store-and-forward-type router utilized in the present example used two levels of encapsulation: the High Level Data Link Control (HDLC) protocol as a transport layer to carry IP datagrams over a Synchronous Optical NETwork (SONET) physical layer. As known to those of ordinary skill in the art, packet over SONET (PoS) is often utilized to carry IP packets in high speed networks because it provides a more efficient link layer than IP over an optical link and faster failure detection than broadcast technologies.

The first level of encapsulation was the SONET framing mechanism. A basic SONET OC-1 frame contains 810 bytes and is repeated with a 8 kHz frequency. This yields a nominal bandwidth of 51.84 Mbps. Since each SONET frame is divided into a transport overhead of 27 bytes, a path overhead of 3 bytes and an effective payload of 780 bytes, the bandwidth accessible to the transport protocol, also called the IP bandwidth, is in fact 49.92 Mbps. OC-n bandwidth (with $n \in \{3, 12, 48, 192\}$) is achieved by merging n basic frames into a single larger frame and sending it at the same 8 kHz rate. In this case, the IP bandwidth is (49.92*n) Mbps. For instance, the IP bandwidth of an OC-3 link is exactly 149.76 Mbps.

The second level of encapsulation in the store-and-forward-type router utilized in the present example was the HDLC transport layer. This protocol adds 5 bytes before and 4 bytes after each IP datagram irrespective of the SONET interface speed.

The layer overheads utilized (i.e., the dual-level encapsulation) mean that in terms of queuing behavior, an IP datagram of size b bytes carried over an OC-3 link should be considered as a b+9 byte packet transmitted at 149.76 Mbps. The significance of this is more fully described below.

Example 3

Time-Stamping of PoS Packets

All measurements were made using high performance passive monitoring "DAG" network measurement cards available from Endace Measurement Systems Ltd. of Auckland, New Zealand. DAG 3.2 cards were used to monitor OC-3 and OC-12 links and DAG 4.11 cards were used to monitor OC-48 links. These cards use different technologies to timestamp PoS packets, as more fully described below.

DAG 3.2 cards are based on a design dedicated to Asynchronous Transfer Mode (ATM) measurement and, therefore, operate with 53 byte chunks corresponding to the length of an ATM cell. The PoS time-stamping functionality was added at a later stage without altering the original 53 byte processing scheme. However, since PoS frames are not aligned with the 53 byte divisions of the PoS stream operated by the DAG card, significant timestamping errors may occur. In fact, a timestamp is generated when a new SONET frame is detected within a 53 byte chunk. This mechanism can cause errors of up to about 2.2 μs on an OC-3 link. See, *High Precision Timing in Passive Measurements of Data Networks*, (*PhD Thesis*); S. Donnelly; University of Waikato (2002), the disclosure of which is hereby incorporated by reference in its entirety.

DAG 4.11 cards, on the other hand, are dedicated to PoS measurement and do not suffer from the same limitations as DAG 3.2 cards. DAG 4.11 cards look past the PoS encapsulation (HDLC in the router utilized in the present example) to consistently timestamp each IP datagram after the first (32 bit) word has arrived.

As a direct consequence of the characteristics of the measurement cards, timestamps on OC-3 links have a worst case precision of about 2.2 μs. Adding errors due to potential GPS synchronization problems between different DAG cards leads to a worst case error of about 6 μs. See, *Packet-Level Traffic Measurements from the Sprint IP Backbone*, C. Fraleigh et al., *IEEE Networks*, vol. 17(6), pp. 6-16 (2003), the disclosure of which is hereby incorporated by reference in its entirety.

Example 4

Experimental Setup

Figure 2:
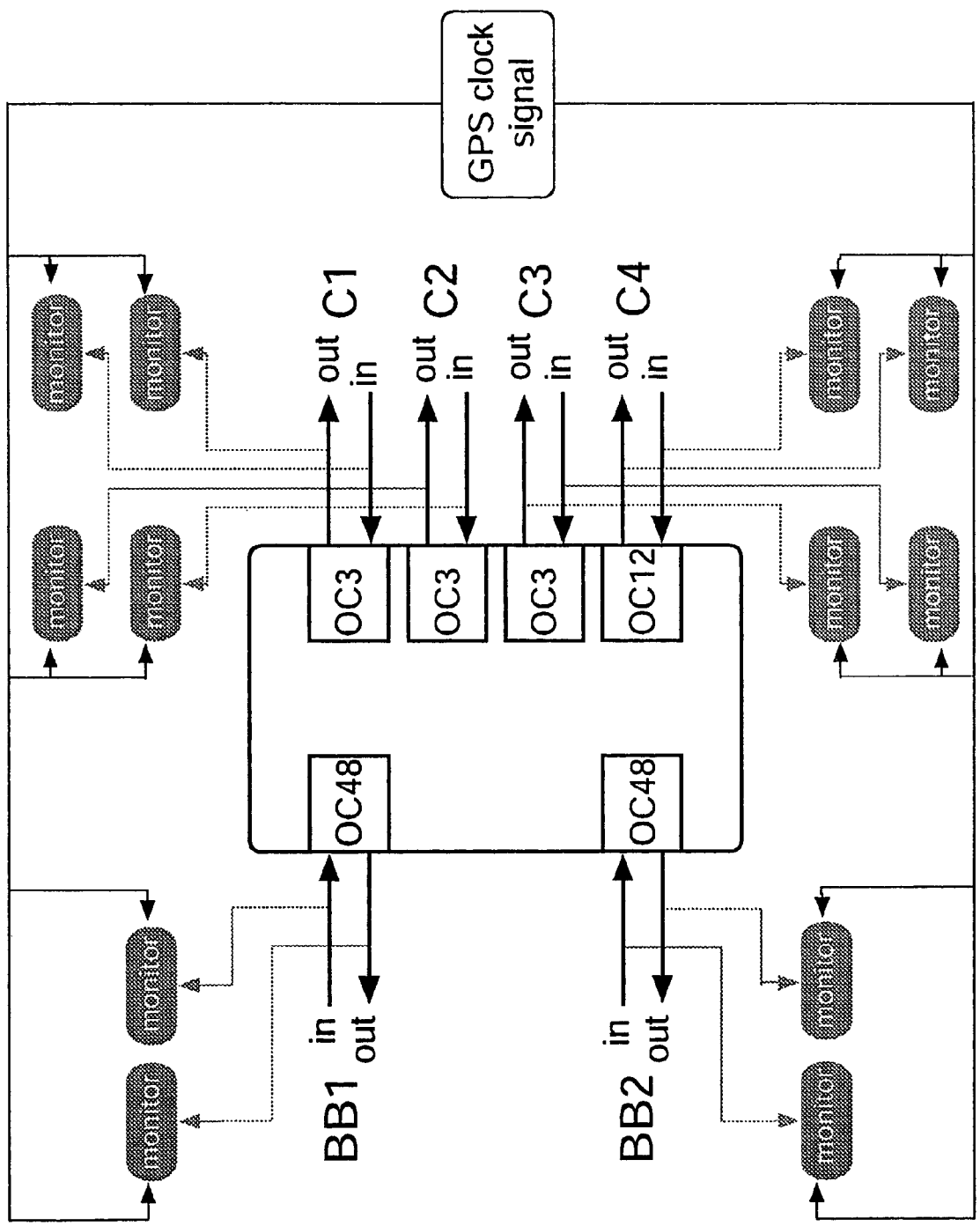
FIG. 2 is a schematic illustration of an experimental setup utilized in collecting data for the examples described herein.

The data for the present example was collected at a gateway (store-and-forward-type) router of the IP backbone network of Sprint Corporation of Overland Park, Kans. Six interfaces of the router were monitored, accounting for more than 99.95% of all traffic flowing through it. The experimental setup utilized is illustrated in FIG. 2. Two of the interfaces were OC-48 linecards connecting to two backbone routers (BB1 and BB2), while the other four interfaces connected customer links: two trans-pacific OC-3 linecards to Asia (C2 and C3), and one OC-3 (C1) and one OC-12 (C4) linecard to domestic customers. A small link (not shown) carrying less than 5 packets per second was not monitored for technical reasons.

Each DAG card was synchronized with the same GPS signal and output a fixed length 64 byte record for each packet on the monitored link. The details of the record are dependent upon the link type (ATM, SONET, or Ethernet). In the experimental setup described herein, all the IP packets were PoS packets and each 64 byte record consisted of 8 bytes for the timestamp, 12 bytes for the control and PoS headers, 20 bytes for the IP header, and the first 24 bytes of the IP payload. Thirteen hours of mutually synchronized traces were captured, representing more than 7.3 billion IP packets or 3 Terabytes of traffic. The DAG cards were located physically close enough to the router so that the time taken by packets to go between them was negligible.

Example 5

Methodology of the Packet Matching Procedure

Subsequent to the trace collection, a packet matching procedure was implemented. The packet matching procedure consisted of identifying, across all the traces, the records corresponding to the same packet appearing at different interfaces at different times. In the present example, the records all relate to a single router. However, it will be understood and appreciated by those of ordinary skill in the art that the packet matching procedure described herein may also be utilized to accommodate multi-hop situations.

Identical packets coming in and out of the router were matched by using a hash table. The hash function was based on the CRC algorithm and used the IP source and destination addresses, the IP header identification number and, in most cases, the full 24 byte IP header data part. In fact, when a packet size was less than 44 bytes, the DAG cards used a padding technique to extend the record length to 64 bytes. Since different models of DAG cards use different padding content, the padded bytes were not included in the hash function. The matching algorithm utilized uses a sliding window over all the synchronized traces in parallel to match packets hashing to the same key. When two packets from two different links were matched, a record of the input and output timestamps, as well as the 44 byte PoS payload, was produced. Sometimes two packets from the same link hashed to the same key because they were identical. These packets were duplicate packets generated by the physical layer. These duplicate packets can create ambiguities in the matching process and were therefore discarded. Their frequency, however, was monitored.

Figure 3:
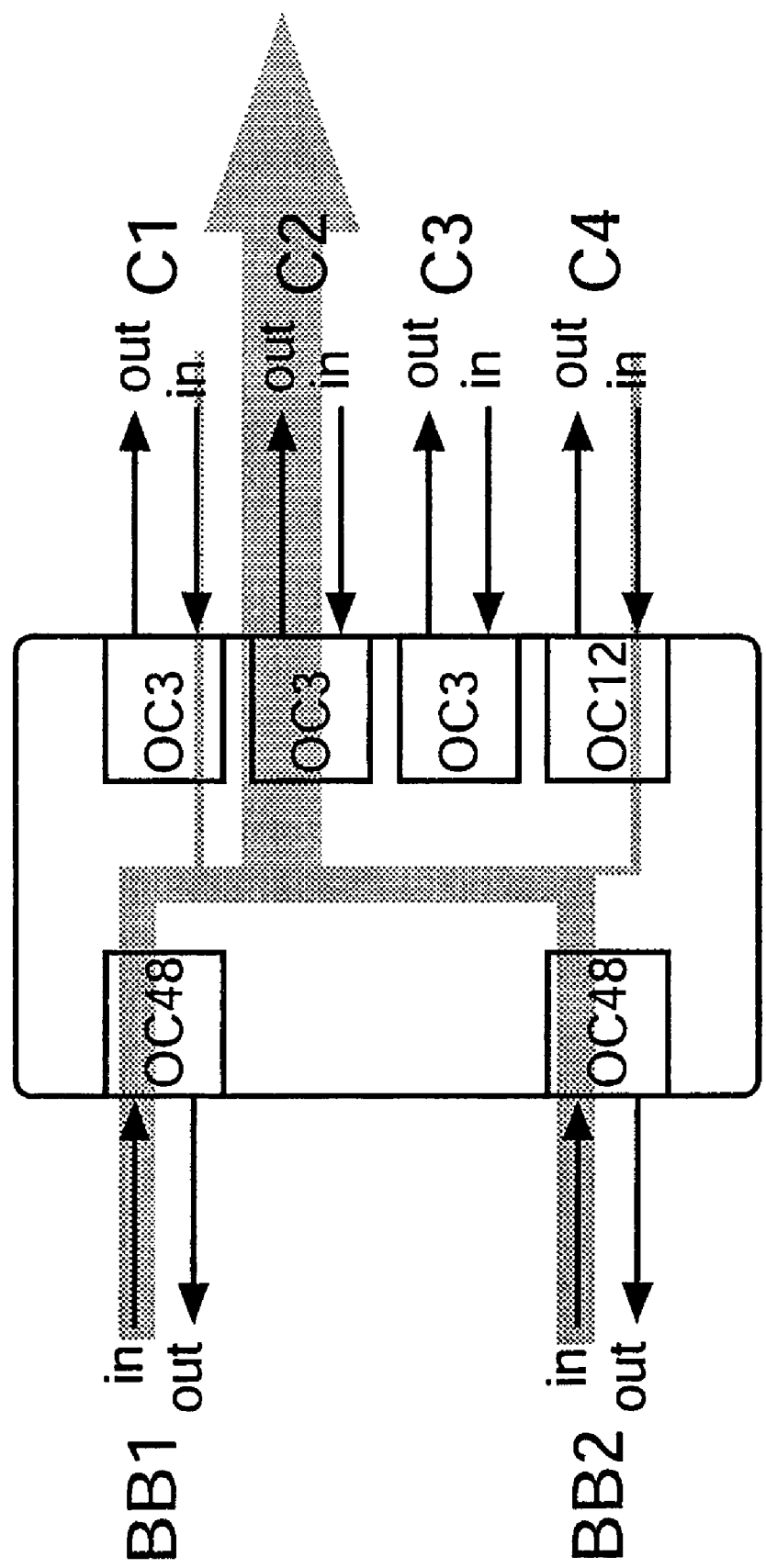
FIG. 3 is a schematic illustration of packets entering the exemplary router shown in FIG. 2 from four separate input links (BB1-in, BB2-in, C1-in, and C4-in) and exiting the router through a single output link (C2-out)

Matching packets is computationally intensive and demanding in terms of storage. In fact, the total size of the result files rivals that of the raw data. For each output link of the router, the packet matching program created one file of matched packets per contributing input link. For instance, for output link C2-out, four files were created corresponding to the packets coming respectively from BB1-in, BB2-in, C1-in, and C4-in, as illustrated in FIG. 3. The input link C3-in had virtually no traffic and was discarded by the matching algorithm utilized. All the packets on a link for which no match could be found were carefully analyzed. Apart from duplicate packets, unmatched packets comprised packets going to or coming from the small unmonitored link, or with source or destination at the router interfaces themselves. Theoretically, there also may be unmatched packets due to packet drops at the router. However, since the router used in the present example did not drop a single packet over the thirteen hours during which it was monitored, no such packets were found.

Assume that the matching algorithm had determined that the $m^{th}$ packet of output link $\Lambda_j$ corresponds to the $n^{th}$ packet of input link $\lambda_i$. This may be formalized by a matching function $\mathcal{M}$ obeying $\mathcal{M}(\Lambda_j, m)$ ($\lambda_i, n$). The packet matching procedure utilized in the present example effectively defines this function for all packets over all output links. Packets that cannot be matched are not considered part of the domain of definition of $\mathcal{M}$.

Table 1 summarizes the results of the packet matching procedure. The percentage of matched packets was at least 99.6% on each link, and as high as 99.98% (link C3-out), showing convincingly that almost all packets were matched. In fact, even if there were no duplicate packets and if absolutely all packets were monitored, 100% could not be attained because of router-generated packets, which represent roughly 0.01% of all traffic.

TABLE I

Trace Details.

| Set | Link | No. of Packets | Average Rate (Mbps) | Matched Packets (% Total Traffic) | Duplicate Packets (% Total Traffic) | Router Traffic (% Total Traffic) |
|---|---|---|---|---|---|---|
| BB1 | in | 817883374 | 83 | 99.87% | 0.045 | 0.004 |
|  | out | 808319378 | 53 | 99.79% | 0.066 | 0.014 |
| BB2 | in | 1143729157 | 80 | 99.84% | 0.038 | 0.009 |
|  | out | 882107803 | 69 | 99.81% | 0.084 | 0.008 |
| C1 | out | 103211197 | 3 | 99.60% | 0.155 | 0.023 |
|  | in | 133293630 | 15 | 99.61% | 0.249 | 0.006 |
| C2 | out | 735717147 | 77 | 99.93% | 0.011 | 0.001 |
|  | in | 1479788404 | 70 | 99.84% | 0.050 | 0.001 |
| C3 | out | 382732458 | 64 | 99.98% | 0.005 | 0.001 |
|  | in | 16263 | 0.003 | N/A | N/A | N/A |
| C4 | out | 480635952 | 20 | 99.74% | 0.109 | 0.008 |
|  | in | 342414216 | 36 | 99.76% | 0.129 | 0.008 |

Figure 4A:
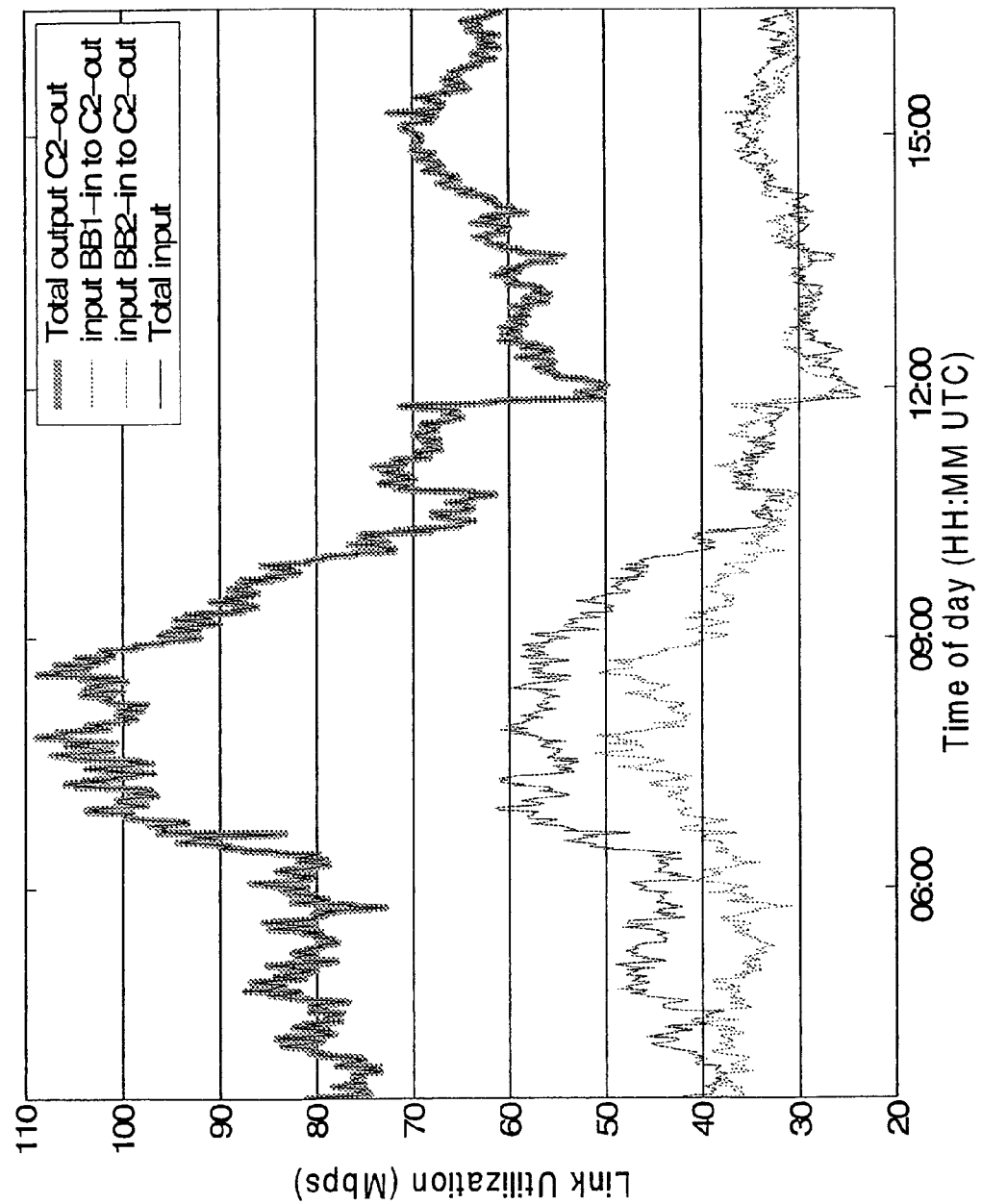
FIG. 4A is graphical representation of the utilization of the C2-out output link shown in FIG. 3 over a monitored thirteen-hour period of time in Megabits per second (Mbps)
Figure 4B:
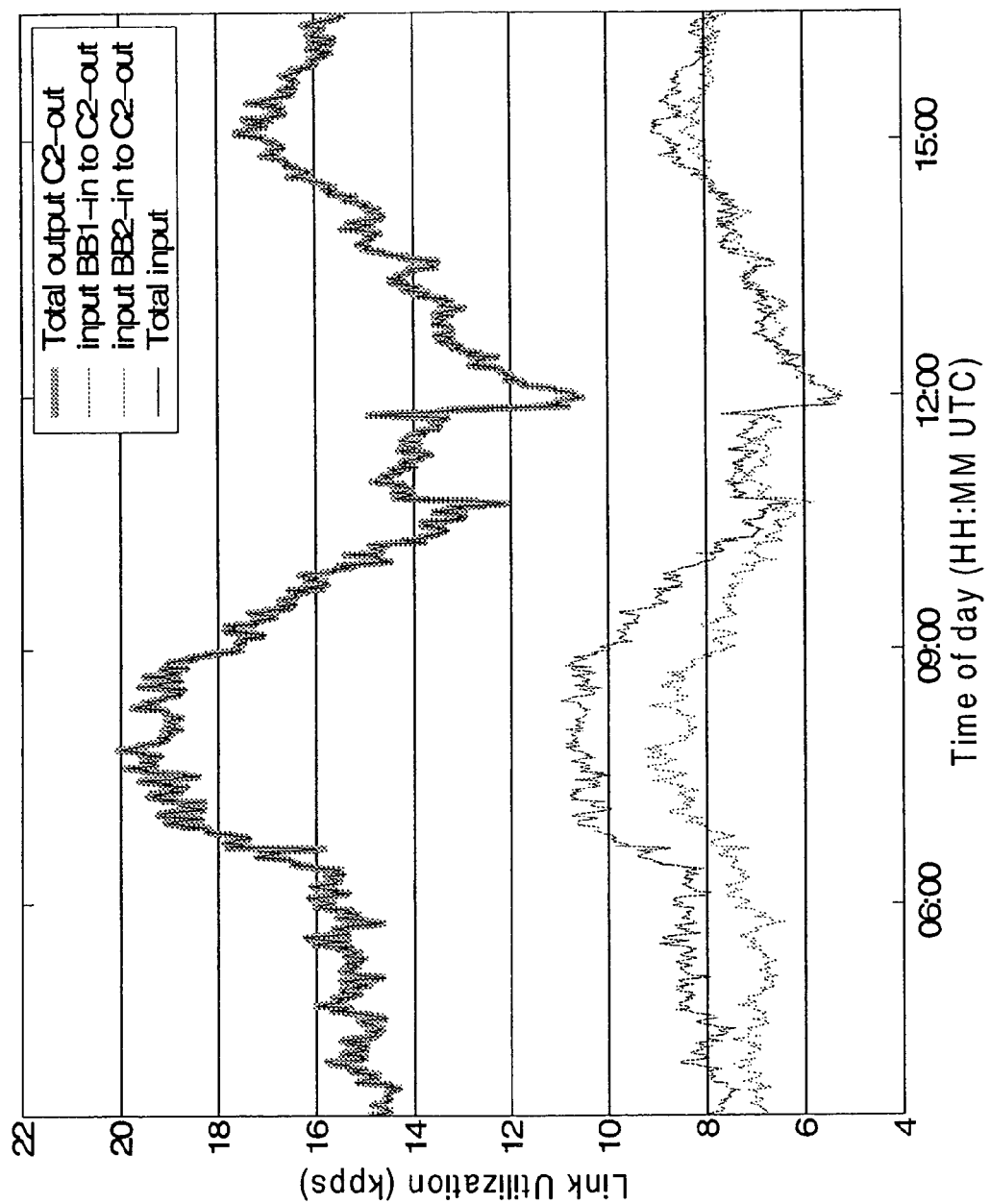
FIG. 4B is a graphical representation of the utilization of the C2-out output link shown in FIG. 3 over the monitored thirteen-hour period of time in kilo packets per second (kpps)

The packet matching results for the customer link C2-out are detailed in Table 2. For this link, 99.93% of the packets can be successfully traced back to packets entering the router. In fact, C2-out received most of its packets from the two OC-48 backbone links, BB1-in and BB2-in. This is illustrated in FIG. 4A wherein the utilization of C2-out across the full thirteen hour monitored period of time is plotted. The breakdown of traffic according to packet origin shows that the contributions of the two incoming backbone links were roughly similar. This is the result of an Equal Cost Multi Path policy which was deployed in the network when packets could follow more than one path to the same destination. While the utilization in Megabits per second (Mbps) in FIG. 4A gives an idea of how congested the link might be, the utilization in packets per second is important from a packet tracking perspective. Since the packet matching procedure utilized was a per packet mechanism, FIG. 4B illustrates the fact that roughly all packets were matched: the sum of the input traffic is almost indistinguishable from the output packet count. FIG. 4B illustrates the utilization in kilo packets per second (kpps).

TABLE 2

Breakdown of packet matching for output link C2-out.

| Set | Link | No. of Matched Packets | % Traffic on C2-out |
|---|---|---|---|
| C4 | in | 215987 | 0.03% |
| C1 | in | 70376 | 0.01% |
| BB1 | in | 345796622 | 47.00% |
| BB2 | in | 389153772 | 52.89% |
| C2 | out | 735236757 | 99.93% |

For the remainder of the present discussion, the focus is on link C2-out as it was the most highly utilized link and was fed by two higher capacity links. It was, therefore, the best candidate for observing queuing behavior within the router under study.

Example 6

System Definition

In order to analyze the data obtained from the packet matching procedure, the system under study was carefully defined and the statistics of the delays experienced by packets crossing the system were presented. The point of view of the following discussion is that of looking from the outside of the router, seen largely as a "black box".

Recall the notation presented above wherein the $m^{th}$ packet of output link $\Lambda_j$ corresponds to the $n^{th}$ packet of input link $\lambda_i$. The DAG timestamped an IP packet on the incoming interface side as $t(\lambda_i,n)$ and later on the outgoing interface at time $t(\Lambda_j,m)$. As the DAG cards were physically close to the router, one might think to define the through-router delay as $t(\Lambda_j,m)-t(\lambda_i,n)$. However, this would amount to defining the router "system" in a somewhat arbitrary way because, as previously discussed, packets are timestamped differently depending on the measurement hardware involved. This and other disadvantages which are discussed more fully below, lead to an alternative definition for through-router delay.

For self-consistency and extensibility to a multi-hop scenario, wherein it would be advantageous to simply add together individual router delays, arrival and departure times of a packet should be measured consistently using the same bit. In this regard, it is natural to focus on the end of the (IP) packet for two reasons. First, as a store-and-forward-type router, the output queue is the most important component to describe. It is therefore appropriate to consider that the packet has left the router when it completes its service at the output queue, that is, when it has completely exited the router. Secondly, and again, as a store-and-forward-type router, no action (for example, the forwarding decision) is performed in the router until the packet has fully entered the router. Thus, the input buffer can be considered as part of the input link, and packet arrival to occur after the arrival of the last bit.

The arrival and departure instants, in fact, define the "system", which is the part of the router on which the study of the present discussion was actually conducted, although it is not exactly the same as the physical router as it excises the input buffer. It was not necessary to model or measure this buffer as it is a component which is already understood.

Subsequently, the precise relationships between the DAG timestamps defined hereinabove and the time instants $\mathcal{T}(\lambda_i,n)$ of arrival and $\mathcal{T}(\Lambda_j,m)$ of departure of a given packet to the system as just defined was established. Denote by $l_n = L_m$ the size of the packet in bytes when indexed on links $\lambda_i$ and $\Lambda_j$, respectively, and let $\theta_i$ and $\Theta_j$ be the corresponding link bandwidths in bits per second. Denote by H the function giving the depth of bytes into the IP packet where the DAG timestamps it. H is a function of the link speed, but not the link direction. For a given link $\lambda_i$, H is defined as $H(\lambda_i) = 4$ if $\lambda_i$ is an OC-48 link and $H(\lambda_i) = b$ if $\lambda_i$ is an OC-3 or OC-12 link. In this instance, b is taken to be a uniformly distributed integer between 0 and min $(l_n, 53)$ to account for the ATM-based discretization described hereinabove. Now the desired system arrival and departure event times may be defined as $$\mathcal{T}(\lambda_i, n) = t(\lambda_i, n) + 8(l_n - H(\lambda_i))/\theta_i$$

$$\mathcal{T}(\Lambda_j, m) = t(\Lambda_j, m) + 8(L_m - H(\Lambda_j))/\Theta_j$$

Figure 5:
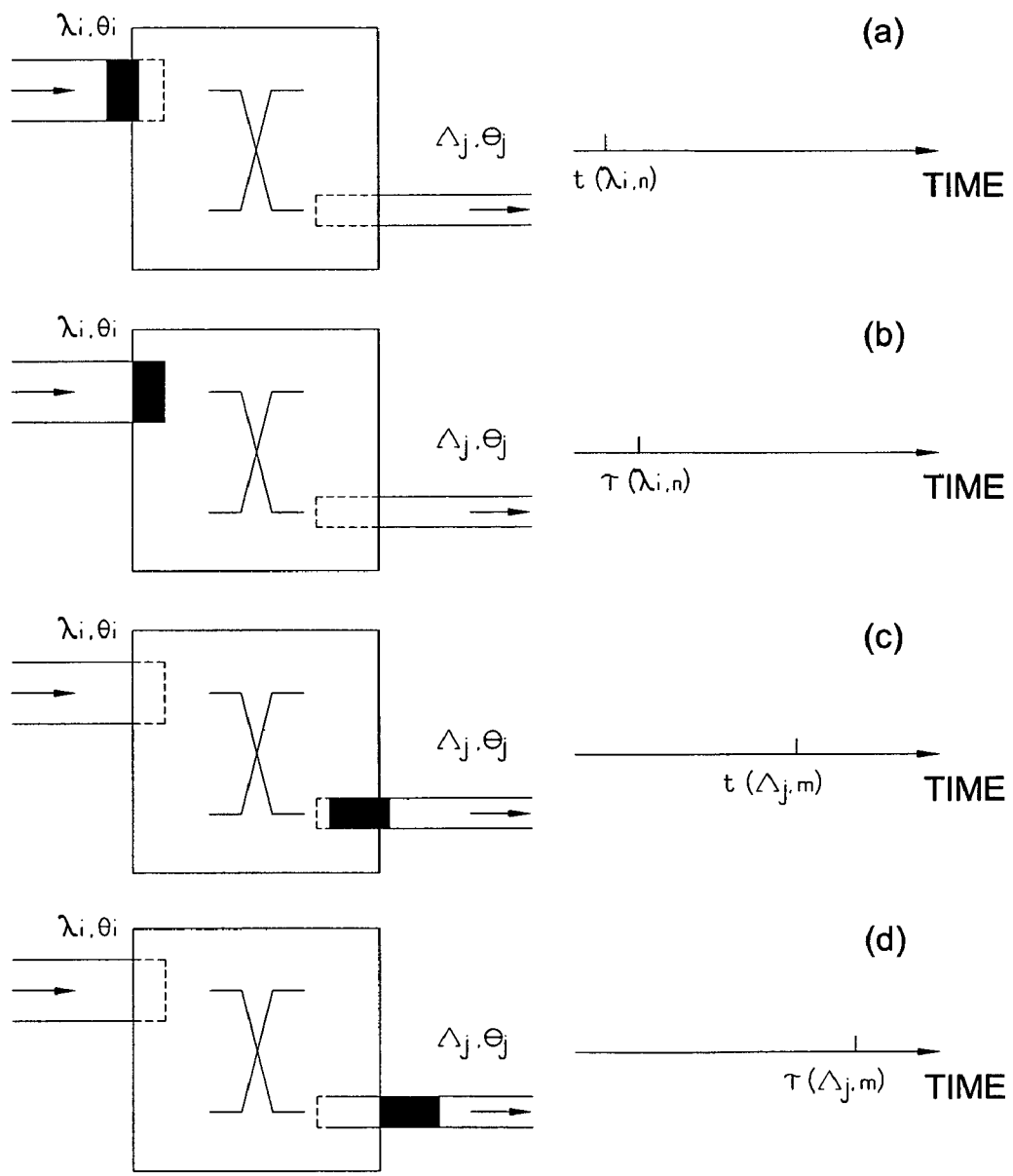
FIG. 5 is a schematic illustration of system arrival and departure event times as a packet travels through the exemplary router of FIG. 2.

These definitions are displayed schematically in FIG. 5. The snapshots shown in FIG. 5 are as follows: At (a), the packet is timestamped by the DAG card monitoring the input interface at time $t(\lambda_i, n)$, at which point it has already entered the router, but not yet the system; at (b) the packet has finished entering the router (arrives at the system) at time $\mathcal{T}(\lambda_i, n)$; at (c) the packet is timestamped by the DAG card at the output interface at time $t(\Lambda_j, m)$; and at (d), the packet fully exits the router (and system) at time $\mathcal{T}(\Lambda_j, m)$.

With the above notations, the through-system delay experienced by packet m on link $\Lambda_j$ may be defined as $d_{\lambda_i, \Lambda_j}(m) = \mathcal{T}(\Lambda_j, m) - \mathcal{T}(\lambda_i, n)$. To simplify notations, this equation is shortened to d (m) in the remainder of the following discussion.

Example 7

Delay Statistics

A thorough analysis of single hop delays was presented in *Analysis of Measured Single-Hop Delay From an Operational Backbone Network*, K. Papagiannaki, et al., *Proc. IEEE Infocom*, New York (2002) (hereinafter the "Papagiannaki reference"), the disclosure of which is incorporated herein by reference in its entirety. A similar methodology was followed in the present example and comparable results were obtained, but with the added certainty gained from not needing to address the sampling issues caused by unobservable packets on the input side.

Figure 6:
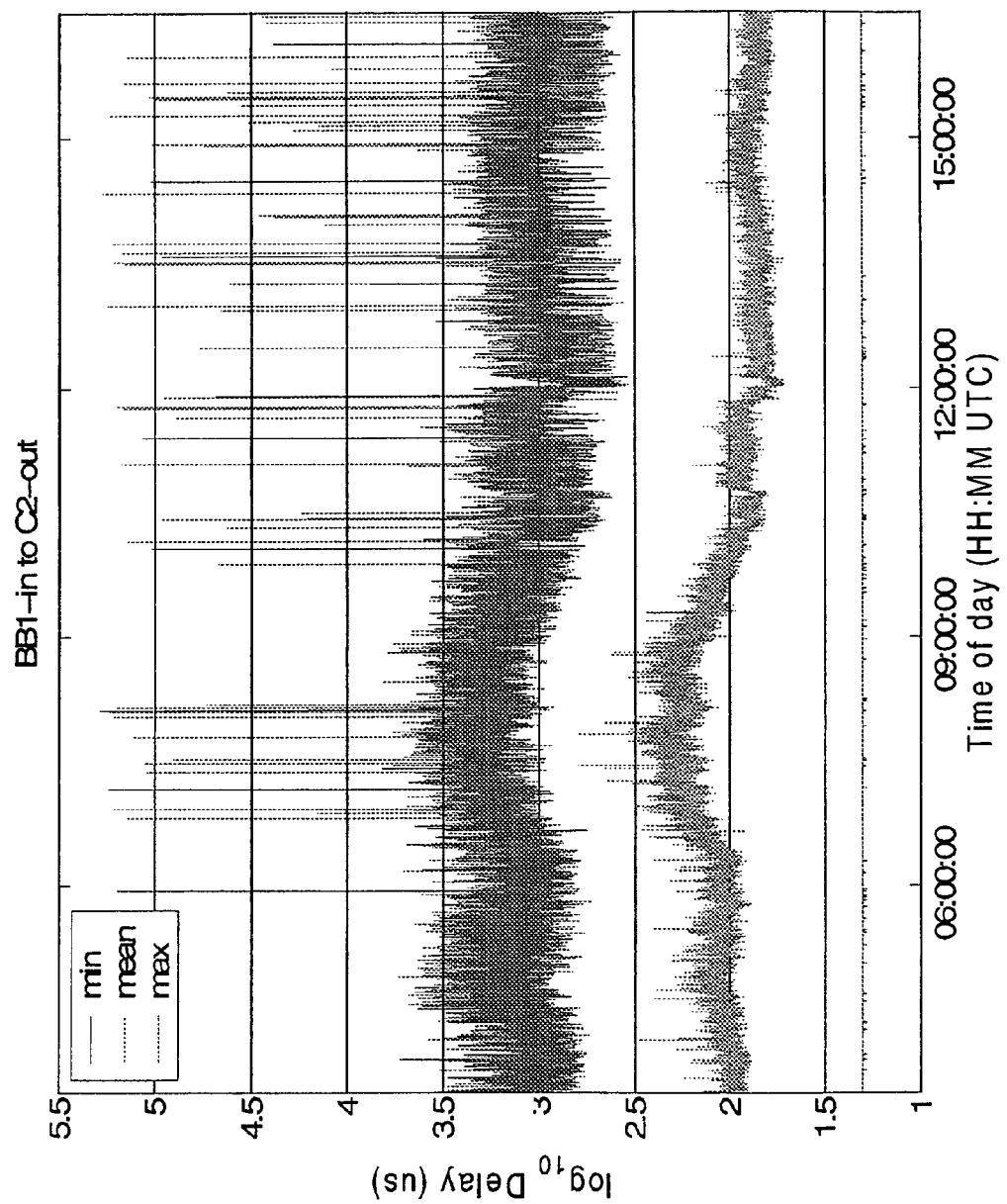
FIG. 6 is a graphical representation of the minimum, mean, and maximum delay experienced by packets going from input link BB 1-in to output link C2-out over consecutive one minute intervals in the exemplary router of FIG. 2.

FIG. 6 illustrates the minimum, mean, and maximum delay experienced by packets going from input link BB1-in to output link C2-out over consecutive one minute intervals. As observed in the Papagiannaki reference, there is a constant minimum delay across time, up to time-stamping precision. The fluctuations in the mean delay follow roughly the changes in the link utilization presented in FIGS. 4A and 4B. The maximum delay value has a noisy component with similar variations to the mean, as well as a spiky component. All the spikes above 10 ms were individually studied. The analysis revealed that they were caused by IP packets carrying options, representing less than 0.0001% of all packets. Option packets take different paths through the router since they are processed through software, while all other packets are processed with dedicated hardware on the so-called "fast path". This explains why they take significantly longer to cross the router.

In any router architecture, it is likely that many components of delay will be proportional to packet size. This is certainly the case for store-and-forward-type routers, as discussed in *Issues and Trends in Router Design*, S. Keshav and S. Rosen, *IEEE Communication Magazine*, vol. 36(5), pp. 144-151 (1998), the disclosure of which is incorporated herein by reference in its entirety. To investigate this in the present example, the "excess" minimum delay experienced by packets of different sizes was computed, that is, not including the packet transmission time on the output link, a packet-size dependent component which is already understood by those of ordinary skill in the art. Formally, for every packet size L, $$\Delta_{\lambda_i, \Lambda_j}(L) = \min_m \{d_{\lambda_i, \Lambda_j}(m) - 8l_m / \Theta_j | l_m = L\}$$

may be computed. Note that the definition of arrival time to the system conveniently excludes another packet-size dependent component, namely the time interval between beginning and completing entry to the router at the input interface.

Figure 7:
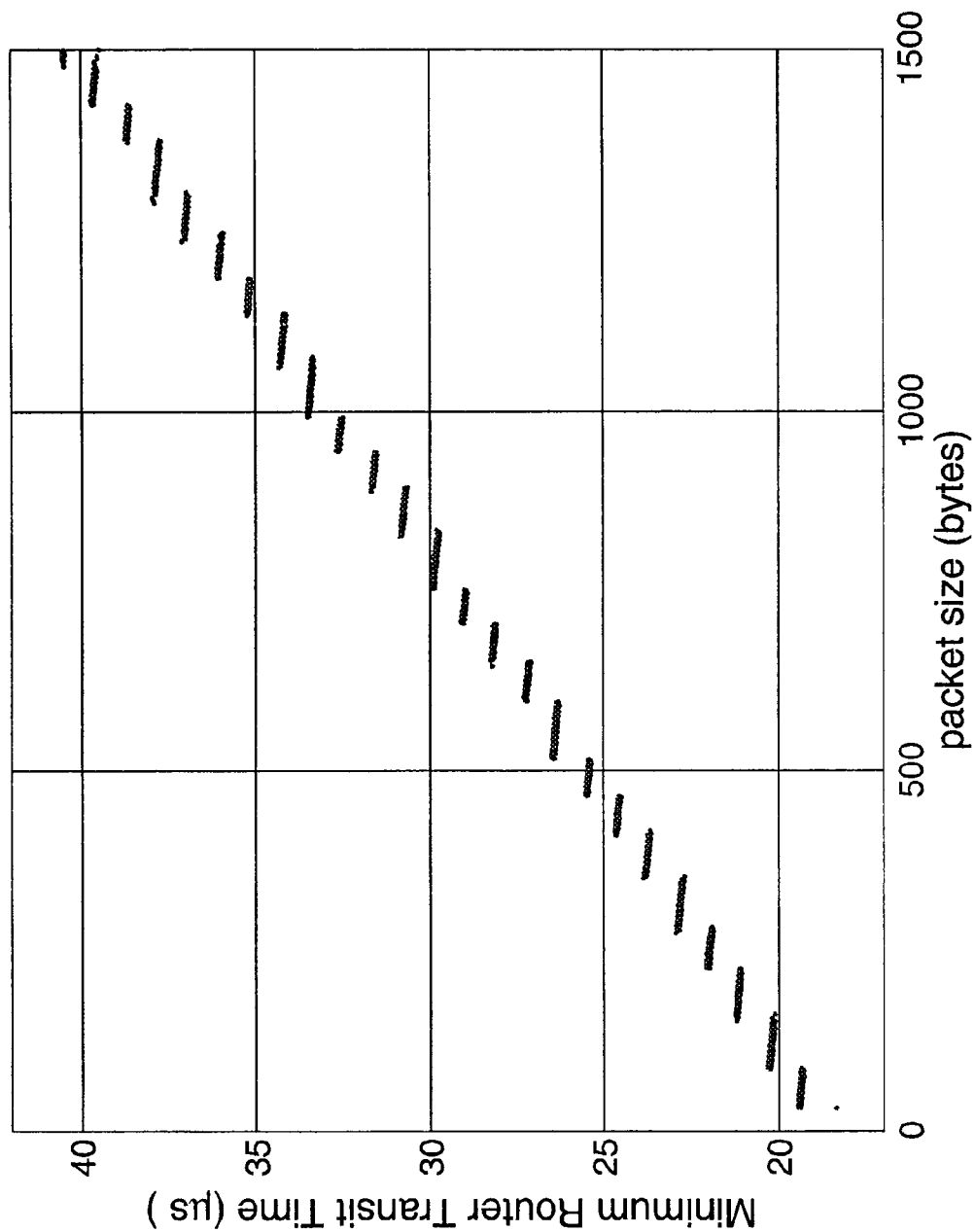
FIG. 7 is a graphical representation of the measured minimum excess system transit times from input link BB1-in to output link C2-out in the exemplary router of FIG. 2.

FIG. 7 shows the values of $\Delta_{\lambda_i, \Lambda_j}(L)$ for packets going from input link BB1-in to output link C2-out. The IP packet sizes observed varied between 28 and 1500 bytes. It was assumed (for each size) that the minimum value found across the monitored thirteen hours corresponded to the true minimum, i.e., that at least one packet encountered no contention on its way to the output queue and no packet in the output queue when it arrived there. In other words, it was assumed that the system was empty from the point of view of this input-output pair. This means that the excess minimum delay corresponds to the time taken to make a forwarding decision (not packet-size dependent), to divide the packet into cells, transmit it across the switch fabric and reassemble it (each being a packet-size dependent operation), and finally to deliver it to the appropriate output queue. The step-like curve indicates that there exist ranges of packet sizes with the same minimum transit time. This is consistent with the fact that each packet is divided into fixed length cells, transmitted through the backplane cell-by-cell, and reassembled. A given number of cells can therefore correspond to a contiguous range of packet sizes with the same minimum transit time.

Example 8

The Fluid Queue

Note some basic properties of FIFO queues that will be central in the following discussion. Consider a FIFO queue with a single server of deterministic service rate $\mu$, and let $t_i$ be the arrival time to the system of packet i of size $l_i$ bytes. Assume that the entire packet arrives instantaneously (which models a fast transfer across the switch), but it leaves progressively as it is served (modeling the output serialization). Thus, it is a fluid queue at the output but not at the input. However, for convenience, the queue is referred to herein as a "fluid queue".

Let $W_i$ be the length of time packet i waits before being served. The service time of packet i is simply $$\frac{l_i}{\mu},$$

so the system time, i.e., the total amount of time spent in the system, is $$S_i = W_i + \frac{l_i}{\mu}.$$

The waiting time of the next packet (i+1) to enter the system may be expressed by the recursion $$W_{i+1} = \left[W_i + \frac{l_i}{\mu} - (t_{i+1} - t_i)\right]^+$$

wherein $[x]^+ = \max(x, 0)$. The service time of packet i+1 reads $$S_{i+1} = [S_i - (t_{i+1} - t_i)]^+ + \frac{l_{i+1}}{\mu}.$$

U(t) denotes the amount of unfinished work at time t, i.e., the time it would take, with no further inputs, for the system to completely drain. The unfinished work at the instant following the arrival of packet i is nothing other than the end-to-end delay that the packet experiences across the queuing system. Note that it is defined at all real times t.

Example 9

The Router Model

The above delay analysis revealed two main features of the system delay which were subsequently taken into account in establishing the model described herein for determining through-router delay. The first is the minimum delay experienced by a packet, which is size, interface, and architecture dependent, and the second is the delay corresponding to the time spent in the output buffer, which is a function of the rate of the output interface and the occupancy of the queue.

Figure 8A:
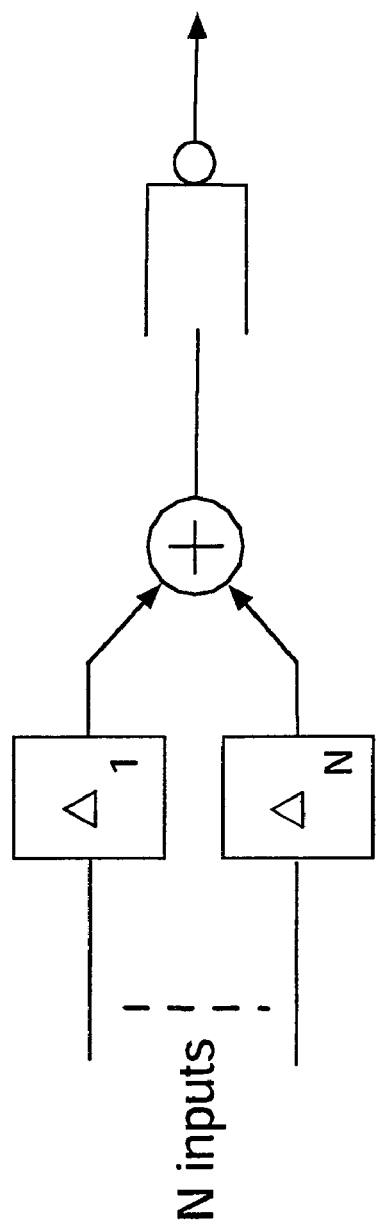
FIG. 8A is a schematic illustration of a simple conceptual model wherein the router includes Virtual Output Queues (VOQs)

Assume that the router has N input links $\lambda_1, \ldots \lambda_N$ contributing to a given output link $\Lambda_j$ and that a packet of size l arriving on link $\lambda_i$ experiences at least the minimum possible delay $\Delta_{\lambda_i,\Lambda_j}(l)$ before being transferred to the output buffer. A representation of this situation is illustrated in FIG. 8A. Two problems may arise in the illustrated situation. First, given different technologies on different interfaces, the functions $\Delta_{\lambda_1,\Lambda_j}, \ldots \Delta_{\lambda_n,\Lambda_j}$ are not necessarily identical. Second, it is not known how to measure, or how to take into account, the potentially complex interactions between packets which do not experience the minimum excess delay but some larger value due to contention in the router arising from cross-traffic.

This was addressed by simplifying the picture still further, in two ways. First, it was assumed that the minimum delays were identical across all input interfaces. That is, it was assumed that a packet of size l arriving on link $\lambda_i$ and leaving the router on link $\Lambda_j$ experienced an excess minimum delay $$\Delta_{\Lambda_j}(l) = \min_i \{\Delta_{\lambda_i,\Lambda_j}(l)\}.$$

Figure 8B:
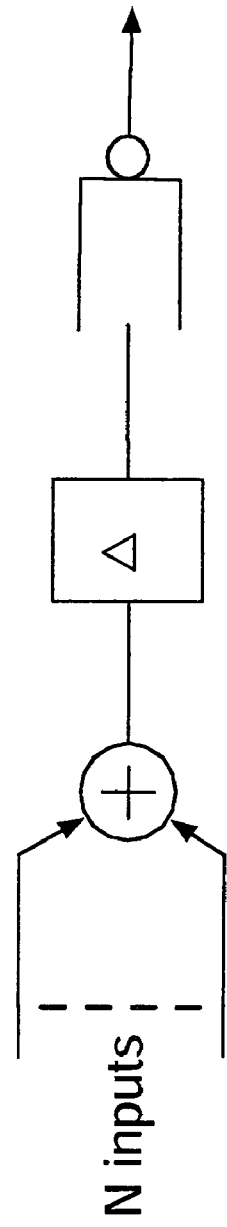
FIG. 8B is a schematic illustration of an embodiment of the model of the present invention wherein all packets experience a single common minimum delay.

(Note that in the following, the subscript $\Lambda_j$ is dropped to ease the notation.) Second, it was assumed that the multiplexing of the different input streams took place before the packets experienced their minimum delay. In other words, it was assumed the order of arrival times was preserved and it was considered that the packets entered a single FIFO input buffer. In doing so, all complex interactions between the input streams were effectively ignored. This highly simplified picture, which is, in fact, the model of one embodiment of the present invention, is shown in FIG. 8B. These simplifications are more fully discussed and justified below.

Suppose that a packet of size l enters the system at time $t^+$ and that the amount of unfinished work in the system at time t was $U(t) > \Delta(l)$. The following two scenarios produce the same total delay:

(i) the packet experiences a delay $\Delta(l)$, then reaches the output queue and waits $U(t) - \Delta(l) > 0$ before being served, or (ii) the packet reaches the output queue straight away but waits U(t) before being served.

In other words, as long as there is more than an amount $\Delta(l)$ of work in the queue when a packet of size l enters the system, the fact that the packet should wait $\Delta(l)$ before reaching the output queue may be neglected. Once the system is busy, it behaves exactly like a simple fluid queue. This implies that no matter how complicated the front end of the router is, one can simply neglect it when the output queue is sufficiently busy. The errors made through this approximation will be strongly concentrated on packets with very small delays, whereas the more important medium to large delays will be faithfully reproduced. Thus this model is both simple and robust.

A system equation for the two stage model described herein can be derived as follows. Assume that the system is empty at time $t_0$ and that packet $k_0$ of size $l_0$ enters the system at time $t_0^+$. It waits $\Delta(l_0)$ before reaching the empty output queue where it immediately starts being served. Its service time is $$\frac{l_o}{\mu}$$

and therefore its total system time is $$S_0 = \Delta(l_0) + \frac{l_0}{\mu}.$$

Next, suppose a second packet enters the system at time t, and reaches the output queue before the first packet has finished being served, i.e., $t_1 + \Delta(l_1) < t_0 + S_0$. It will start being served when packet $k_0$ leaves the system, i.e., at $t_0 + S_0$. Its system time may therefore be represented by $$S_1 = S_0 - (t_1 - t_0) + \frac{l_1}{\mu}.$$

The same recursion holds for successive packets k and k+1 as long as the amount of unfinished work in the queue remains above $\Delta(l_{k+1})$ when packet k+1 enters the system, that is, $t_{k+1} + \Delta(l_{k+1}) < t_k + S_k$. Therefore, as long as equation $t_{k+1} + \Delta(l_{k+1}) < t_k + S_k$ is verified, the system times of successive packets may be obtained by the same recursion as for the case of a busy fluid queue:

$$S_{k+1} = S_k - (t_{k+1} - t_k) + \frac{l_{k+1}}{\mu}.$$

Next, suppose that packet k+1 of size $l_{k+1}$ enters the system at time $t_{k+1}^+$ and that the amount of unfinished work in the system at time $t_{k+1}$ is such that $0 < U(t_{k+1}) < \Delta(l_{k+1})$. In this case, the output buffer will be empty by the time packet k+1 reaches it after having waited $\Delta(l_{k+1})$ in the first stage of the model. The service time of packet k+1 therefore reads $$S_{k+1} = \Delta(l_{k+1}) + \frac{l_{k+1}}{\mu}.$$

Note that in this situation, the output queue may be empty but the system may still be busy with a packet waiting in the front end. This is also true of the actual router.

Once the queue has drained, the system is idle until the arrival of the next packet. The time between the arrival of a packet to the empty system and the time when the system becomes empty again defines a system busy period or congestion episode. Note that this analysis has assumed an infinite buffer size. This is a reasonable assumption since it is quite common for a linecard to be able to accommodate up to 500 ms worth of traffic.

Example 10

Evaluation of the Model and Comparison with Empirical Delay Measurements

Figure 9A:
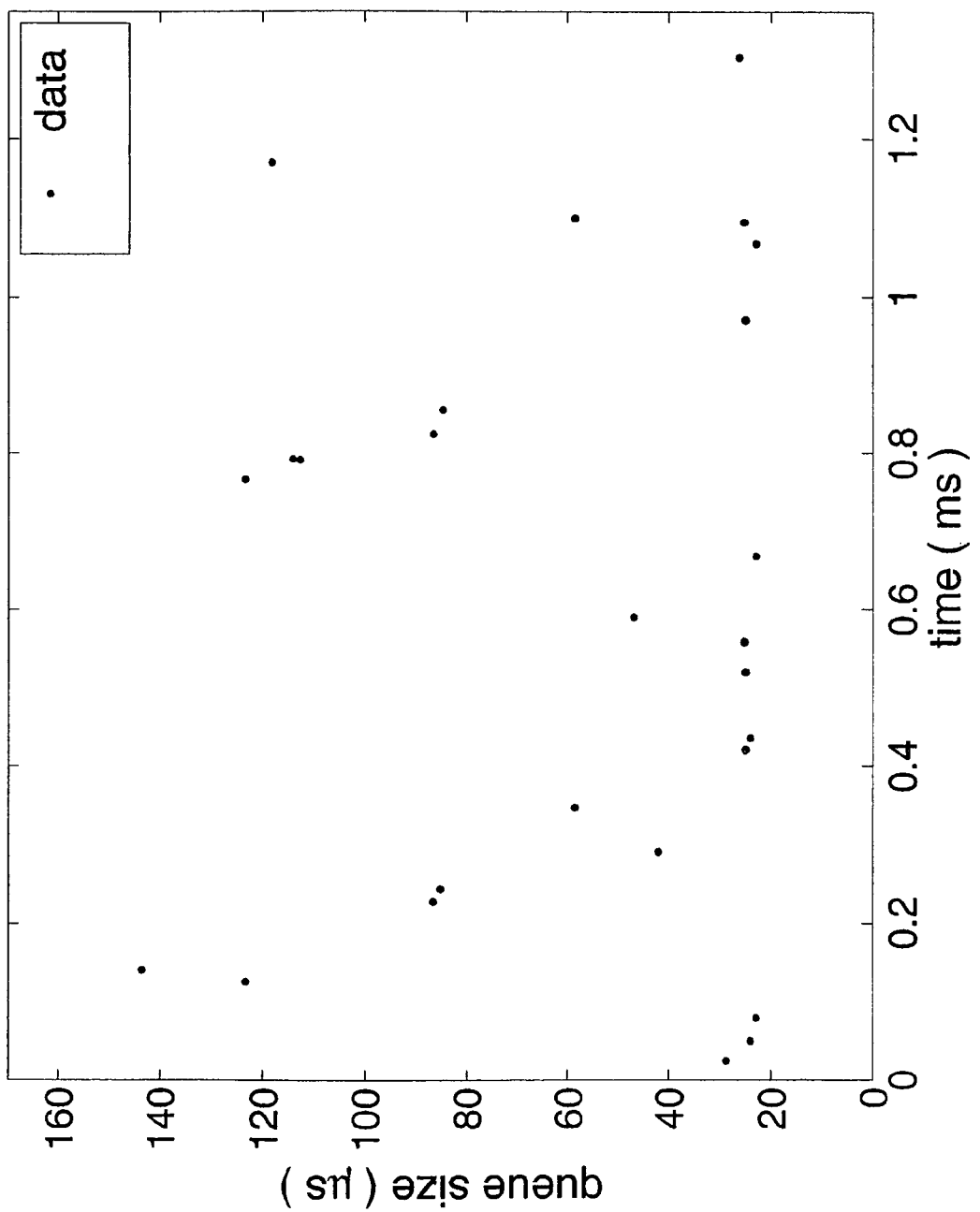
FIG. 9A is a graphical representation of a sample path of the unfinished work corresponding to a fragment of real traffic destined to C2-out wherein the black dots represent the actual measured delays for the corresponding input packets.
Figure 9B:
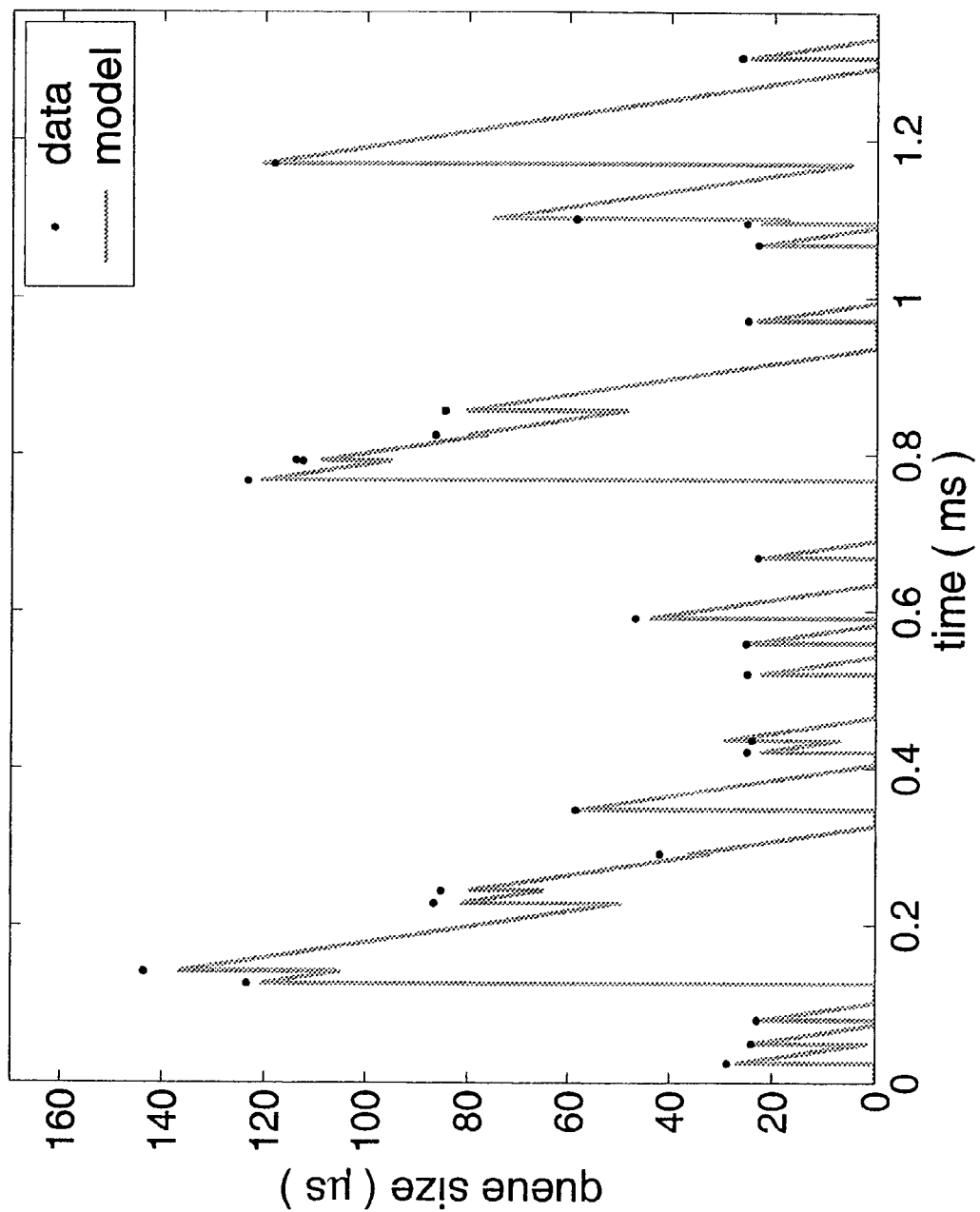
FIG. 9B is a graphical representation illustrating the correlation between modeled delays (gray line) and the actual measured delays shown in FIG. 9A.
Figure 10A:
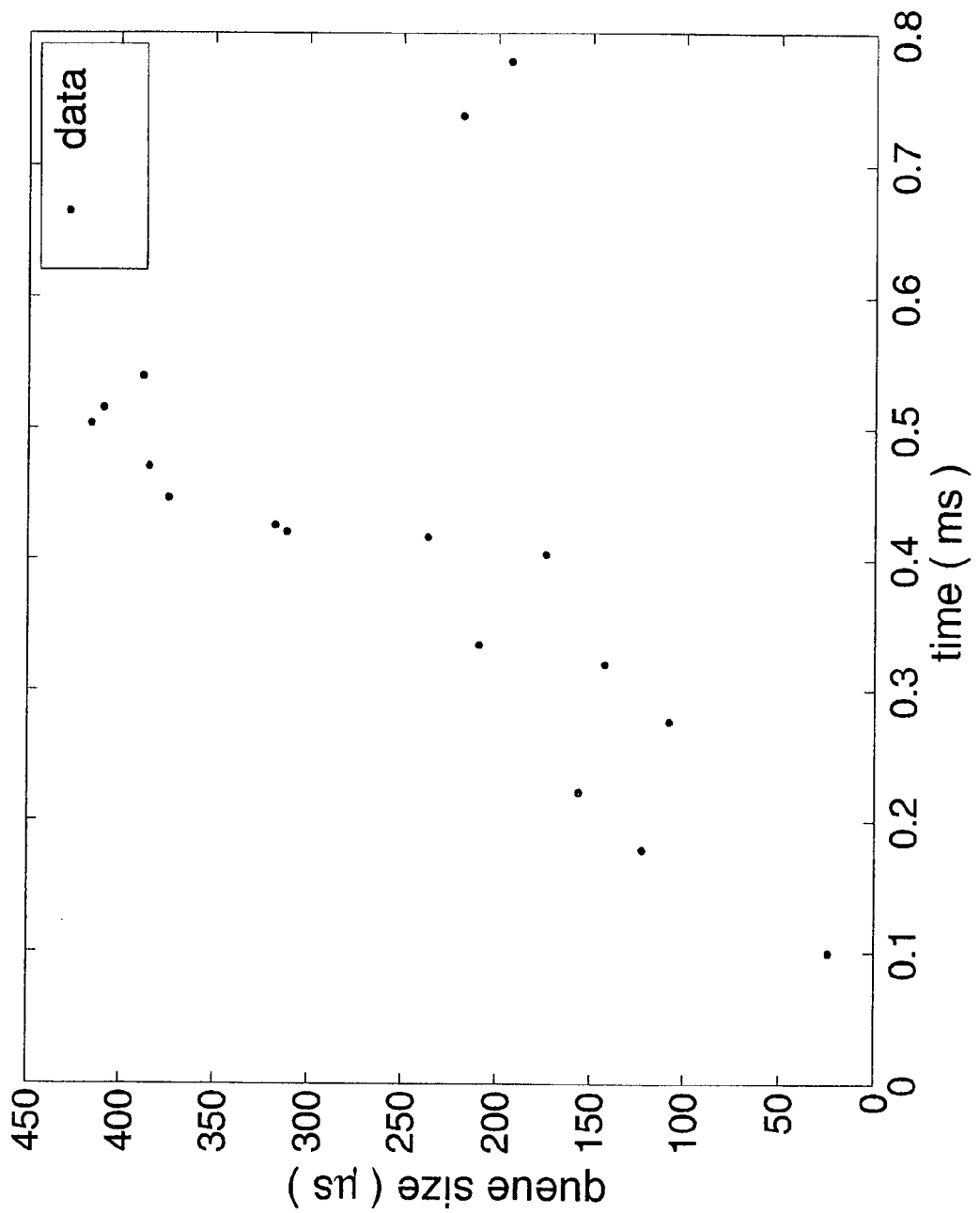
FIG. 10A is a graphical representation of another sample path of the unfinished work corresponding to a fragment of real traffic destined to C2-out wherein the black dots represent the actual measured delays for the corresponding input packets.
Figure 10B:
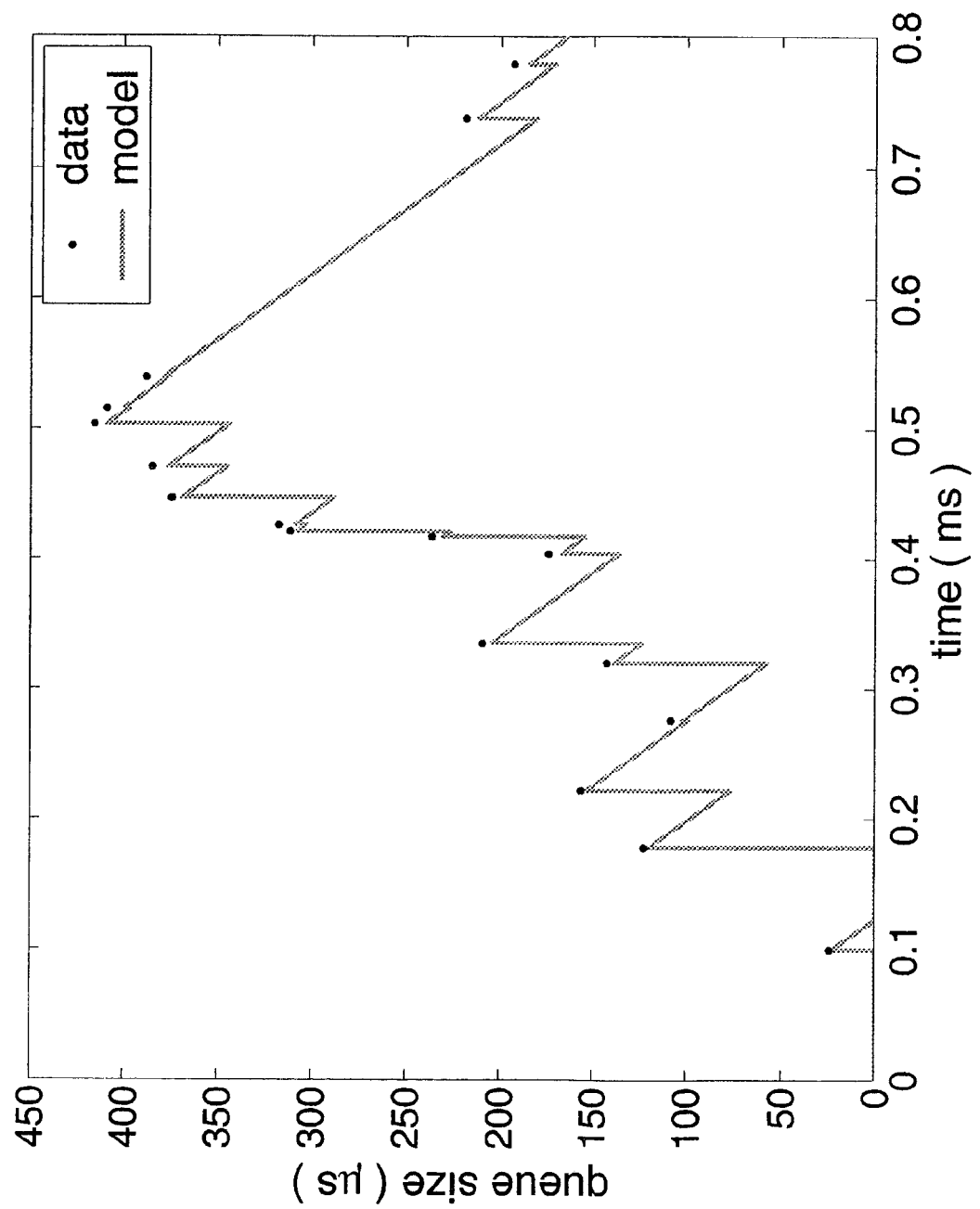
FIG. 10B is a graphical representation illustrating the correlation between modeled delays (gray line) and the actual measured delays shown in FIG. 10A.

The model delays were obtained by multiplexing the traffic streams BB1-in to C2-out and BB2-in to C2-out and feeding the resulting packet train to the model in an exact trace driven "simulation". FIGS. 9A and 10A show two sample paths of the unfinished work U(t) corresponding to two fragments of real traffic destined to C2-out. The process U(t) is a continuous jump process where each jump marks the arrival time of a new packet. The resultant new local maximum is the time taken by the newly arrived packet to cross the system, that is, its delay. The black dots represent the actual measured delays for the corresponding input packets. In practice, the queue state can only be measured when a packet enters the system. Thus, the black dots can be thought of as samples of U(t) obtained from measurements. Referring to FIGS. 9B and 10B, the gray lines represent the modeled delays for the sample paths of FIGS. 9A and 10A, respectively. As is readily apparent, agreement between the actual measurements and the modeled delays was very good.

Figure 11A:
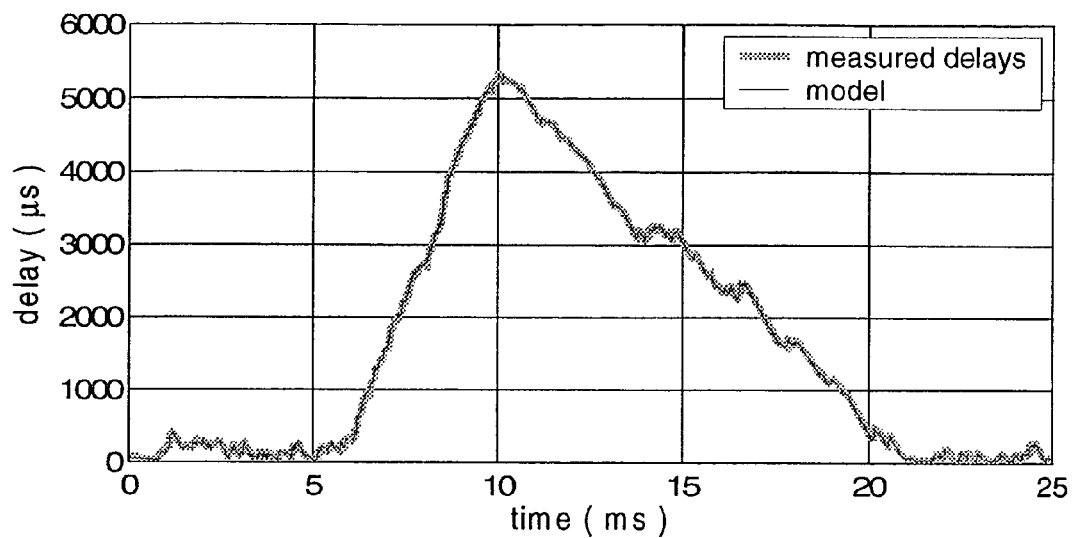
FIG. 11A is a graphical representation of measured delays versus model predictions.
Figure 11B:
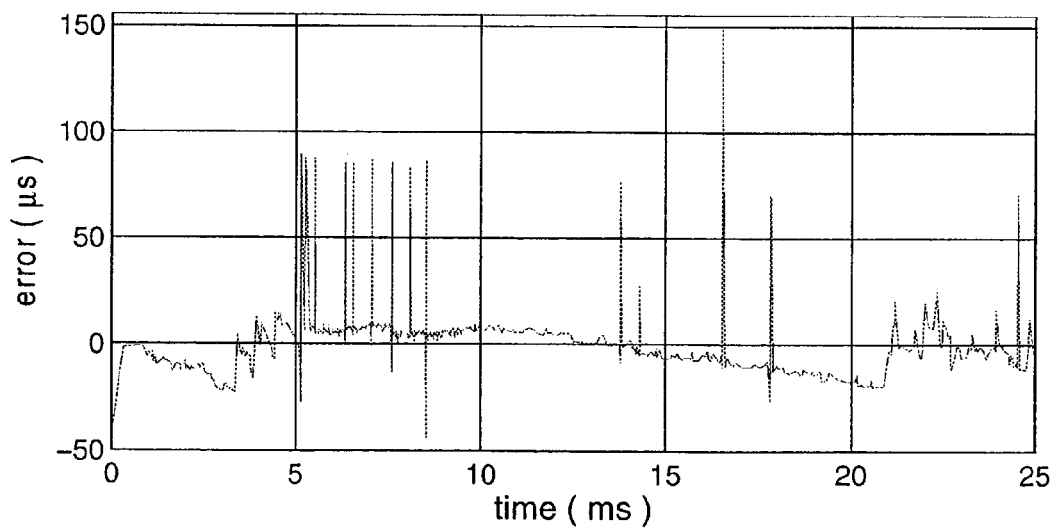
FIG. 11B is a graphical representation of absolute error between the measured delays and model predictions shown in FIG. 11A.

In order to evaluate the model, examination of a set of busy periods on link C2-out involving 510 packets was conducted. FIG. 11A shows the system times experienced by incoming packets, both from the model and from measurements. The largest busy period of FIG. 11A has a duration of roughly 16 ms and an amplitude of more than about 5 ms. Once again, the model reproduced the measured delays very well. FIG. 11B illustrates the difference between measured and modeled delays at each packet arrival time, plotted on the same time axis as FIG. 11A.

It is worth noting three points concerning the accuracy of the present model. First, the absolute error is within about 30 μs of the measured delays for almost all packets. Second, the error is much larger for a few packets, as shown by the spiky behavior of FIG. 11B. These spikes are due to a local reordering of packets inside the router that is not captured by the model of this embodiment of the present invention. Recall from FIG. 8B that the simplifying assumption that the multiplexing of the input streams takes place before the packets experience their minimum delay was made. This means that packets exit the system of this embodiment of the present invention in the exact same order as they entered it. However, in practice, local reordering can happen when a large packet arrives at the system on one interface just before a small packet on another interface. Given that the minimum transit time of a packet depends linearly on its size (see, FIG. 7), the small packet can overtake the large one and reach the output buffer first. Once the two packets have reached the output buffer, the amount of work in the system is the same, irrespective of their arrival order. Thus, these local errors do not accumulate. Intuitively, local reordering requires that two packets arrive almost at the same time on two different interfaces. This is much more likely to happen when the links are busy. This is in agreement with FIGS. 11A and 11B which indicate that spikes always happen when the queuing delays are increasing, a sign of high local link utilization.

The third point worth noting is the systematic linear drift of the error across a busy period duration. This is due to the fact that the queuing model described herein drains slightly faster than the real queue. While the inventors hereof have not confirmed any physical reason why the IP bandwidth of the link C2-out is smaller than predicted, the important observation is that this phenomenon is only noticeable for very large busy periods, and is lost in measurement noise for most busy periods.

It should also be noted that the model does not take into account the fact that a small number of option packets will take a "slow" software path through the router instead of being entirely processed at the hardware level. As a result, option packets experience a much larger delay before reaching the output buffer. However, as far as the model is concerned, transit times through the router only depend on packet sizes. Additionally, the output queue of the model stores not only the packets crossing the router, but also the "unmatched" packets generated by the router itself, as well as control PoS packets. These packets are not accounted for in this model.

Figure 12A:
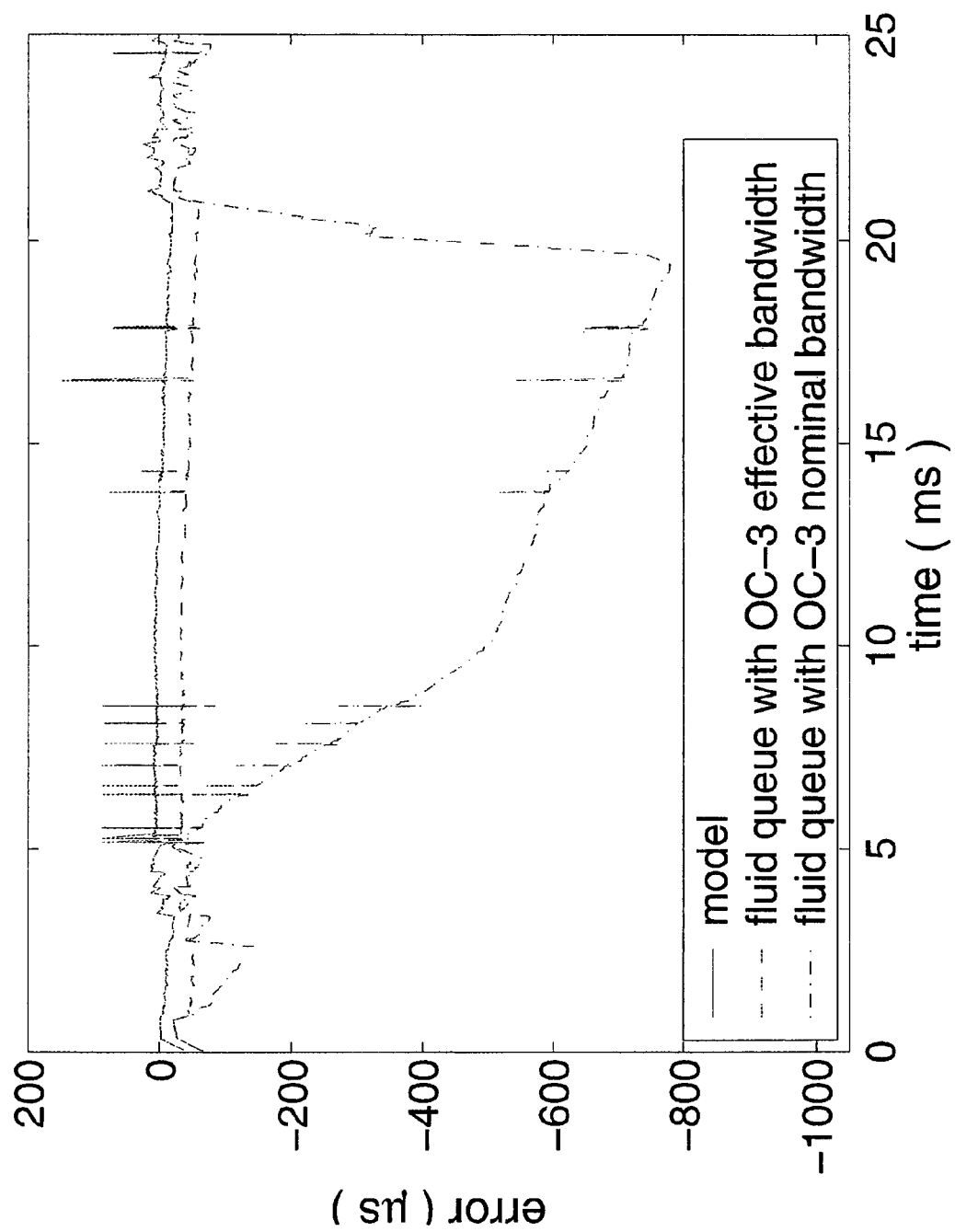
FIG. 12A is a graphical representation of a comparison of the errors made on the packet delays from the OC-3 link C2-out presented in FIG. 11B with the two-stage model of one embodiment of the present invention, a fluid queue with OC-3 nominal bandwidth, and a fluid queue with OC-3 IP bandwidth.

Despite its simplicity, the model is considerably more accurate than prior art single-hop delay models. FIG. 12A illustrates a comparison of the errors made on the packet delays from the OC-3 link C2-out presented in FIG. 11B with three different models: the two-stage model presented herein, a fluid queue with OC-3 nominal bandwidth, and a fluid queue with OC-3 IP bandwidth. As expected, with a simple fluid model, i.e., when the minimum transit time is not taken into account, all the delays are systematically underestimated. If, moreover, the nominal link bandwidth (155.52 Mbps) is chosen for the queue instead of a carefully justified IP bandwidth (149.76 Mbps), the errors inside a busy period build up very quickly because the queue drains too fast. There is, in fact, only about a 4% difference between the nominal and effective bandwidths, but this is enough to create errors up to about 800 μs inside a moderately large busy period.

Figure 12B:
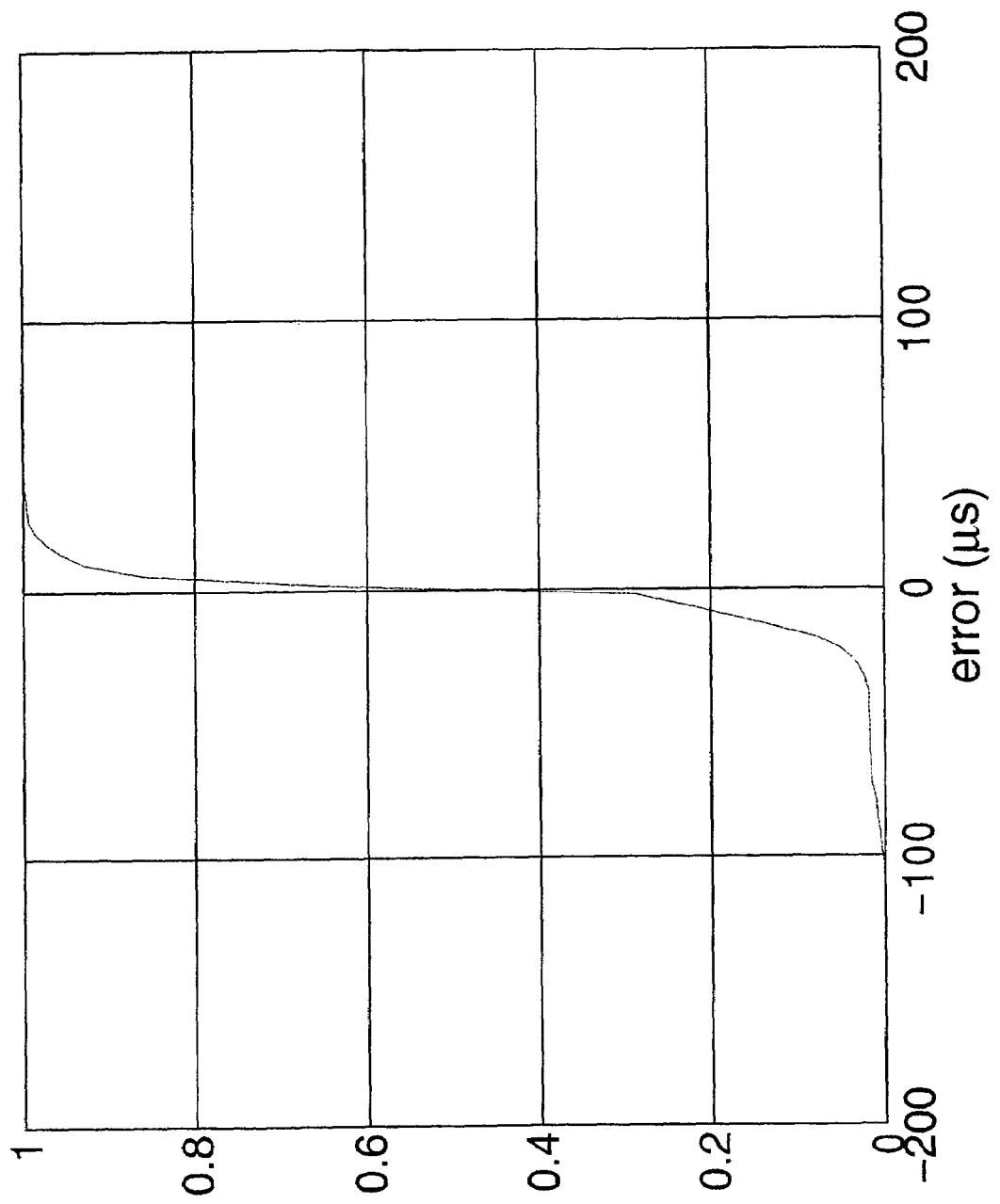
FIG. 12B is a graphical representation illustrating the cumulative distribution function of the delay error over a five-minute window on link C2-out.

FIG. 12B illustrates the cumulative distribution function of the delay error for a five-minute window of C2-out traffic. Of the delays inferred by the model, about 90% are within about 20 μs of the measured ones. Given the time-stamping precision issues described hereinabove, these results are very satisfactory.

Figure 12C:
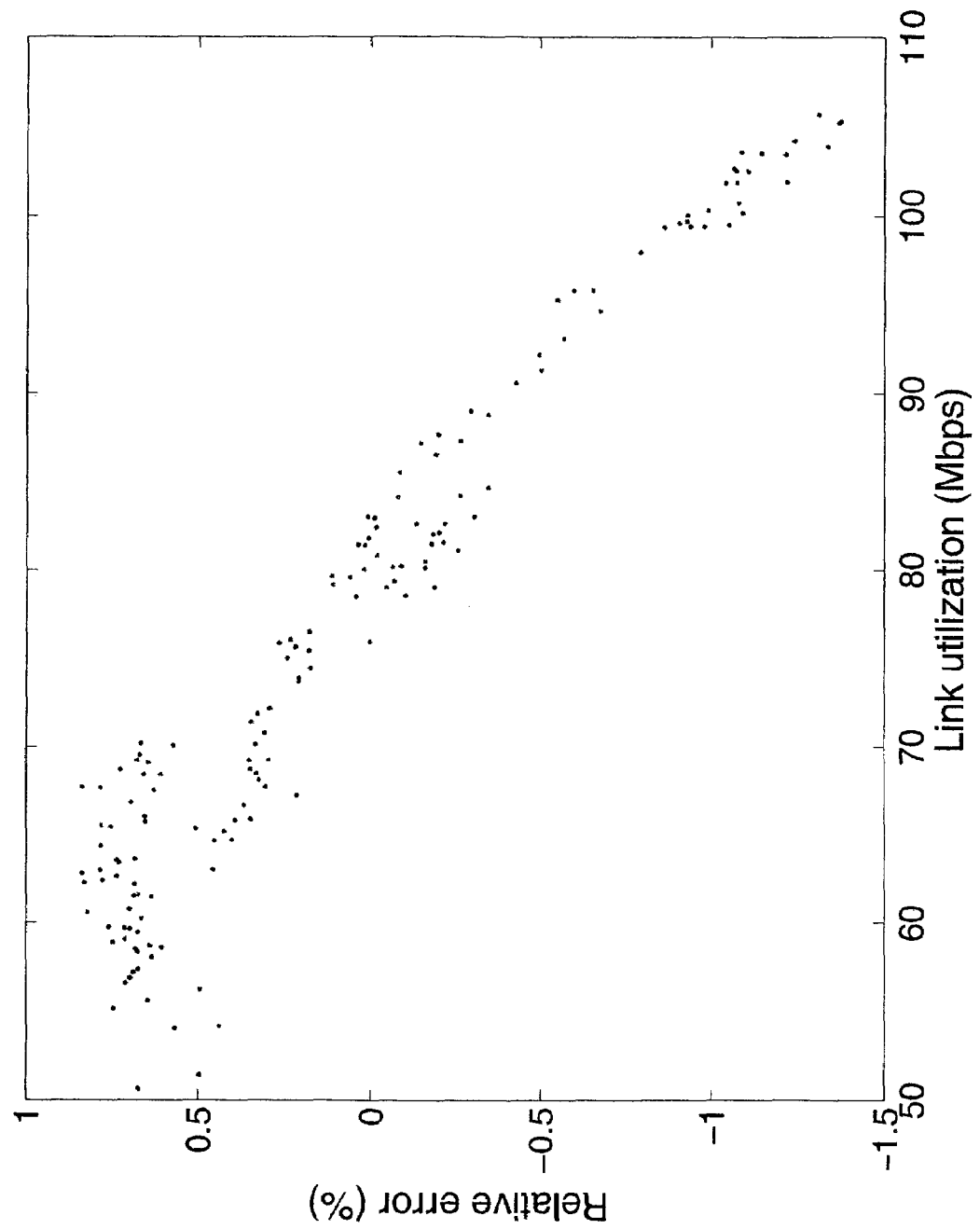
FIG. 12C is a graphical representation illustrating the relative mean error between delay measurements and the present model on link C2-out versus link utilization.

Next, the performance of the model over the entire thirteen hours of traffic on C2-out was evaluated. The period was divided into 156 intervals of five minutes each. For each interval, the average relative delay error was plotted against the average link utilization. The results are presented in FIG. 12C. As is apparent, the absolute relative error was less than about 1.5% for the whole trace, which confirms the excellent match between the model and the measurements. For large utilization levels, the relative error grew due to the fact that large busy periods were more frequent. The packet delays therefore had a tendency to be underestimated more often due to the unexplained bandwidth mismatch occurring inside large busy periods. However, overall, the model performed very well over a large range of link utilizations.

Example 11

Understanding and Reporting Delay Performance

As described and illustrated hereinabove, the router model described herein is capable of accurately predicting delays when the input traffic is fully characterized. However, in practice, the traffic is unknown, which is why network operators rely on available simple statistics, such as curves giving upper bounds on delay as a function of link utilization, when they want to infer packet delays through their networks. The problem is that these curves are not unique since packet delays depend not only on the mean traffic rate, but also on more detailed traffic statistics.

In fact, as discussed hereinabove, using average packet delays from link utilization alone can be very misleading as a way of inferring packet delays. As such, the model described herein instead examines performance related questions by going back to the source of large delays: queue build-ups in the output buffer. In the following Examples 12-15, using an understanding of the router mechanisms obtained from measurements and modeling work discussed hereinabove, the statistics and causes of busy periods are described. Secondly, a simple mechanism that could be used to report useful delay information about a router is proposed.

Example 12

Defining Busy Periods

Recall that the definition of a busy period or congestion episode, as these terms are utilized herein, is the time between the arrival of a packet in the empty system and the time when the system goes back to its empty state. The equivalent definition in terms of measurements is as follows: a busy period starts when a packet of size l bytes crosses the system with a delay $$\frac{\Delta(l) + l}{\mu}$$

and it ends with the last packet before the start of another busy period. This definition, which makes full use of obtained measurements and is a lot more robust than an alternate definition based solely on packet inter-arrival times at the output link. For instance, if busy periods were to be detected by using timestamps and packet sizes to group together back-to-back packets, the following two problems may occur. First, time-stamping errors may lead to wrong busy periods separations. Second, and more importantly, packets belonging to the same busy period are not necessarily back-to-back on the output link, as described hereinabove.

Example 13

Busy Period Statistics

Figure 13A:
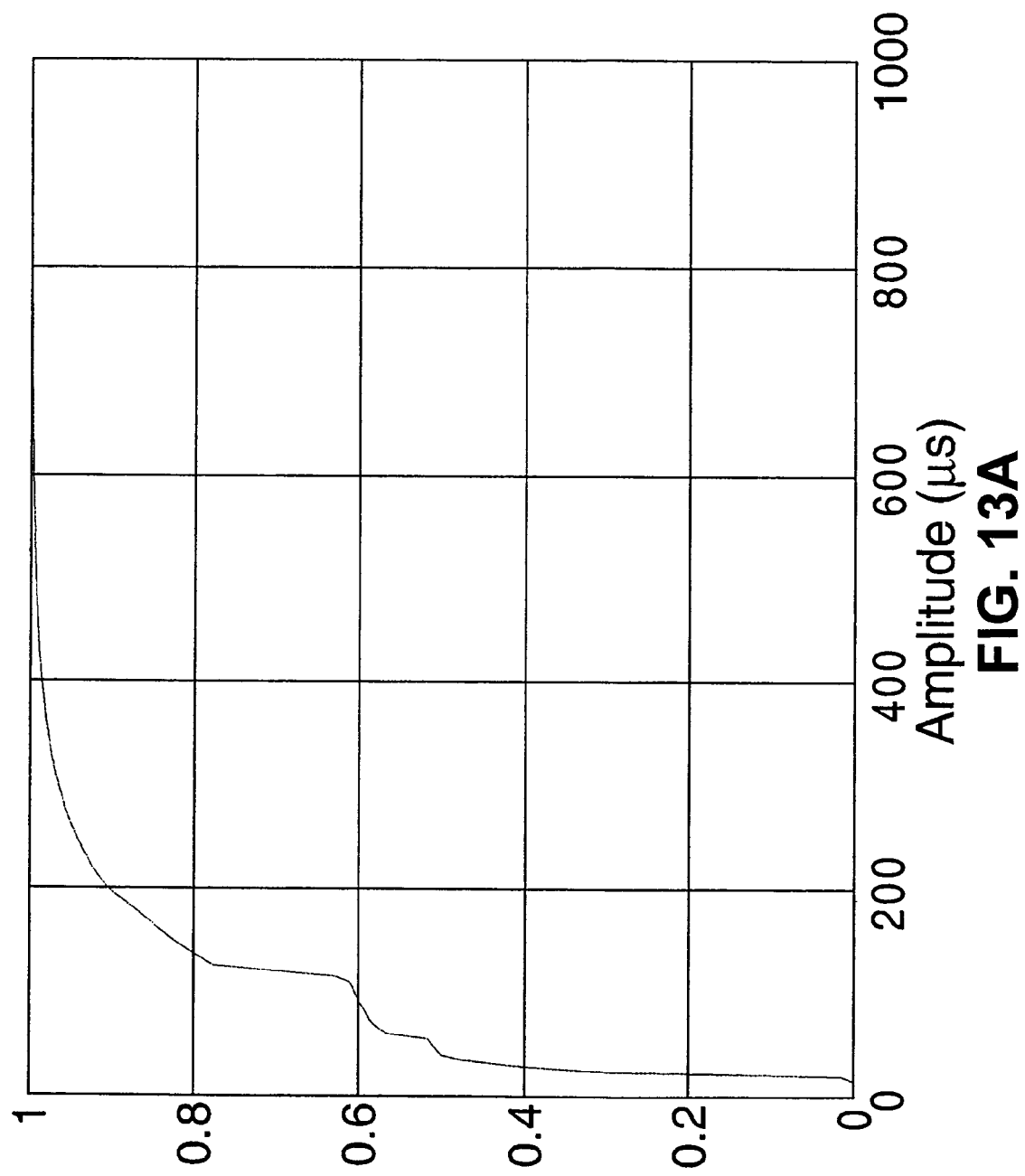
FIG. 13A is a graphical representation of the cumulative distribution function of busy period amplitude for a five-minute traffic window.
Figure 13B:
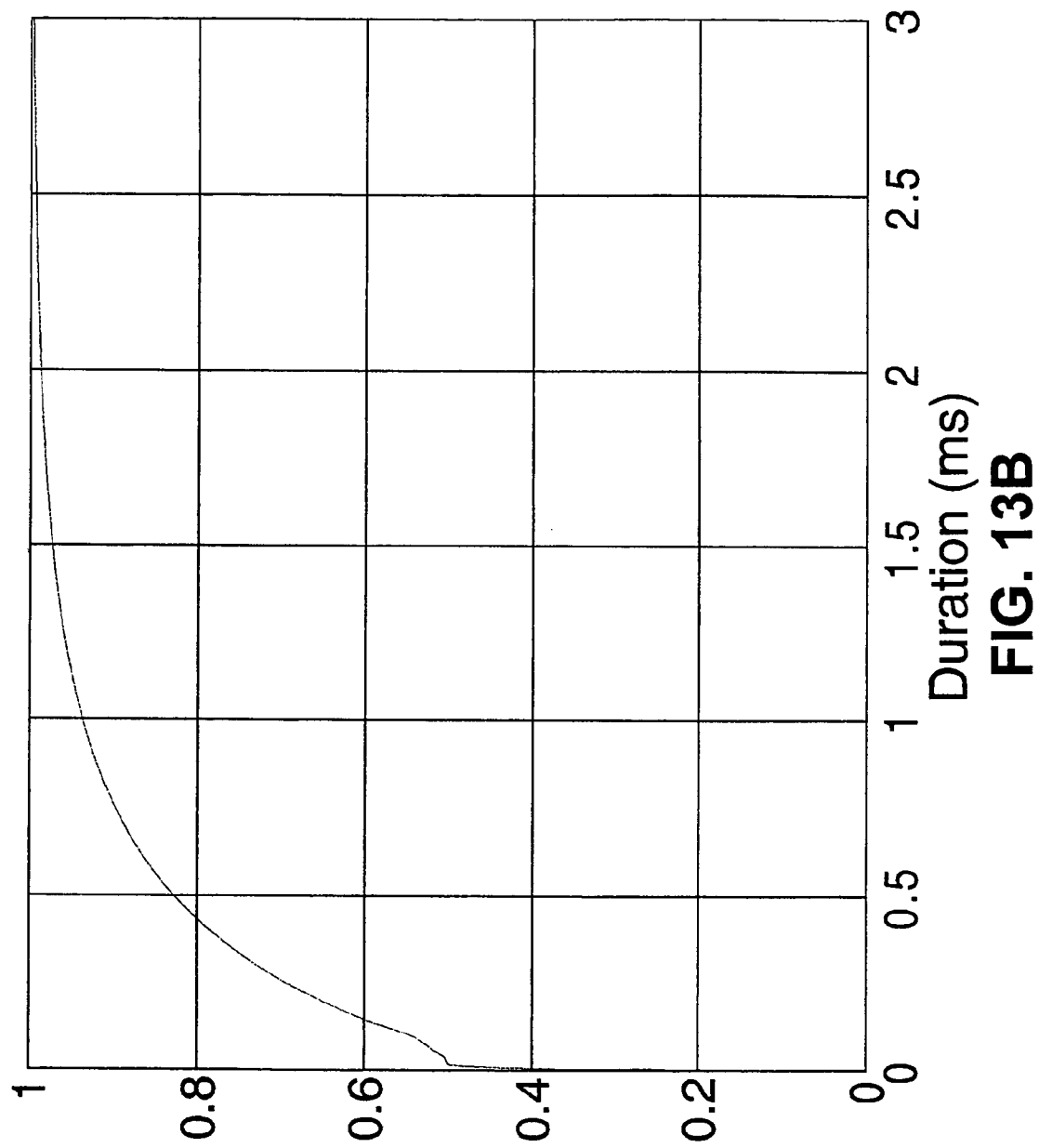
FIG. 13B is a graphical representation of the cumulative distribution function of duration for the same five-minute traffic window as FIG. 13A.
Figure 13C:
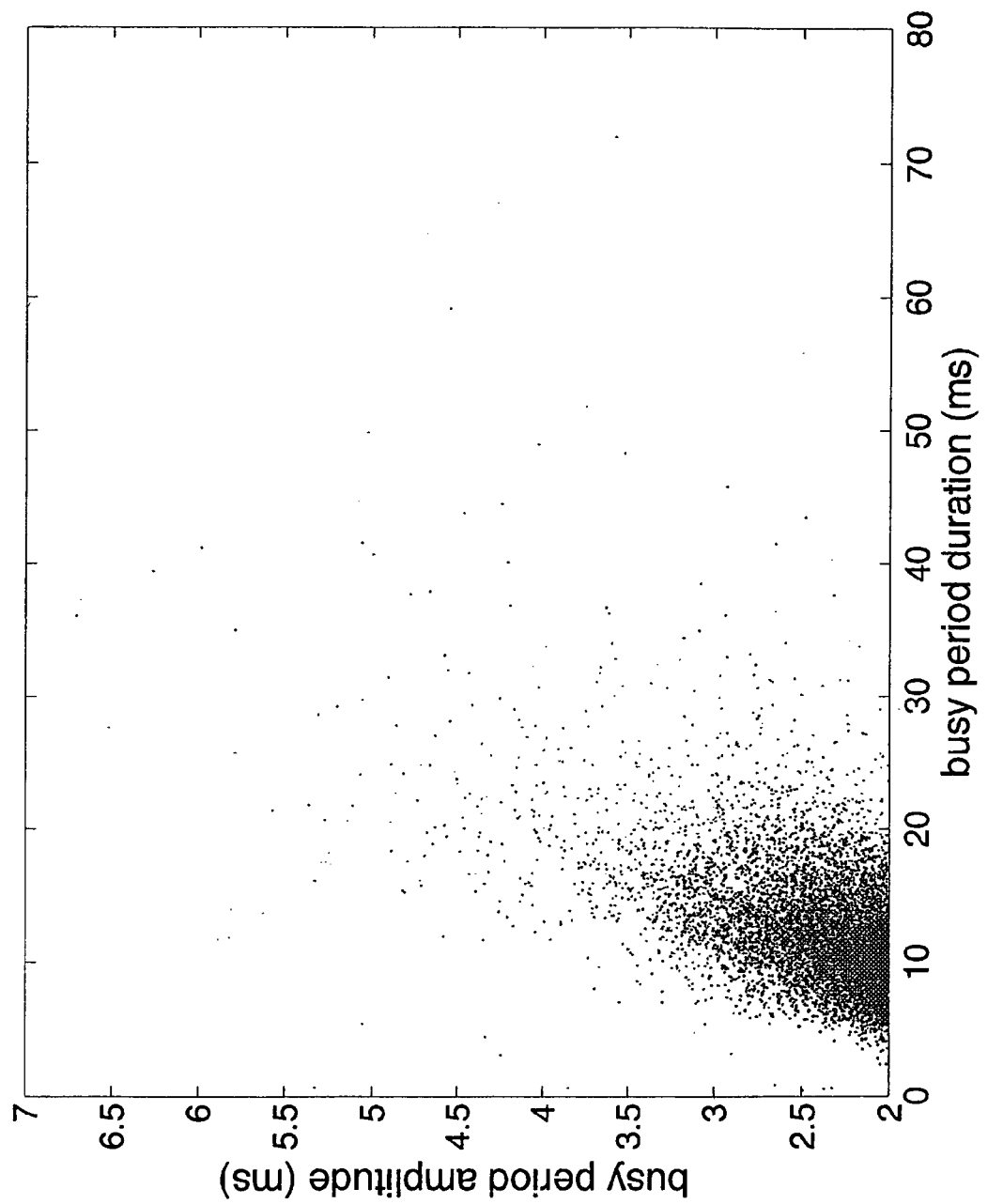
FIG. 13C is a scatter plot of busy period amplitudes against busy period durations for amplitudes larger than about 2 ms on link C2-out (busy periods containing option packets are not shown)

To describe busy periods, statistics per busy period, such as duration, number of packets and bytes, and amplitude (maximum delay experienced by a packet inside the busy period) were collected. The cumulative distribution functions (CDF) of busy period amplitudes and durations are plotted in FIGS. 13A and 13B for a five-minute traffic window. For this traffic window, about 90% of busy periods have an amplitude smaller than about 200 μs, and about 80% last less than about 500 μs. FIG. 13C shows a scatter plot of busy period amplitudes against busy period durations for amplitudes larger than 2 ms on link C2-out (busy periods containing option packets are not shown). There does not seem to be any clear pattern linking amplitude and duration of a busy period in this data set, although, roughly speaking, the longer the busy period, the larger its amplitude.

Figure 13D:
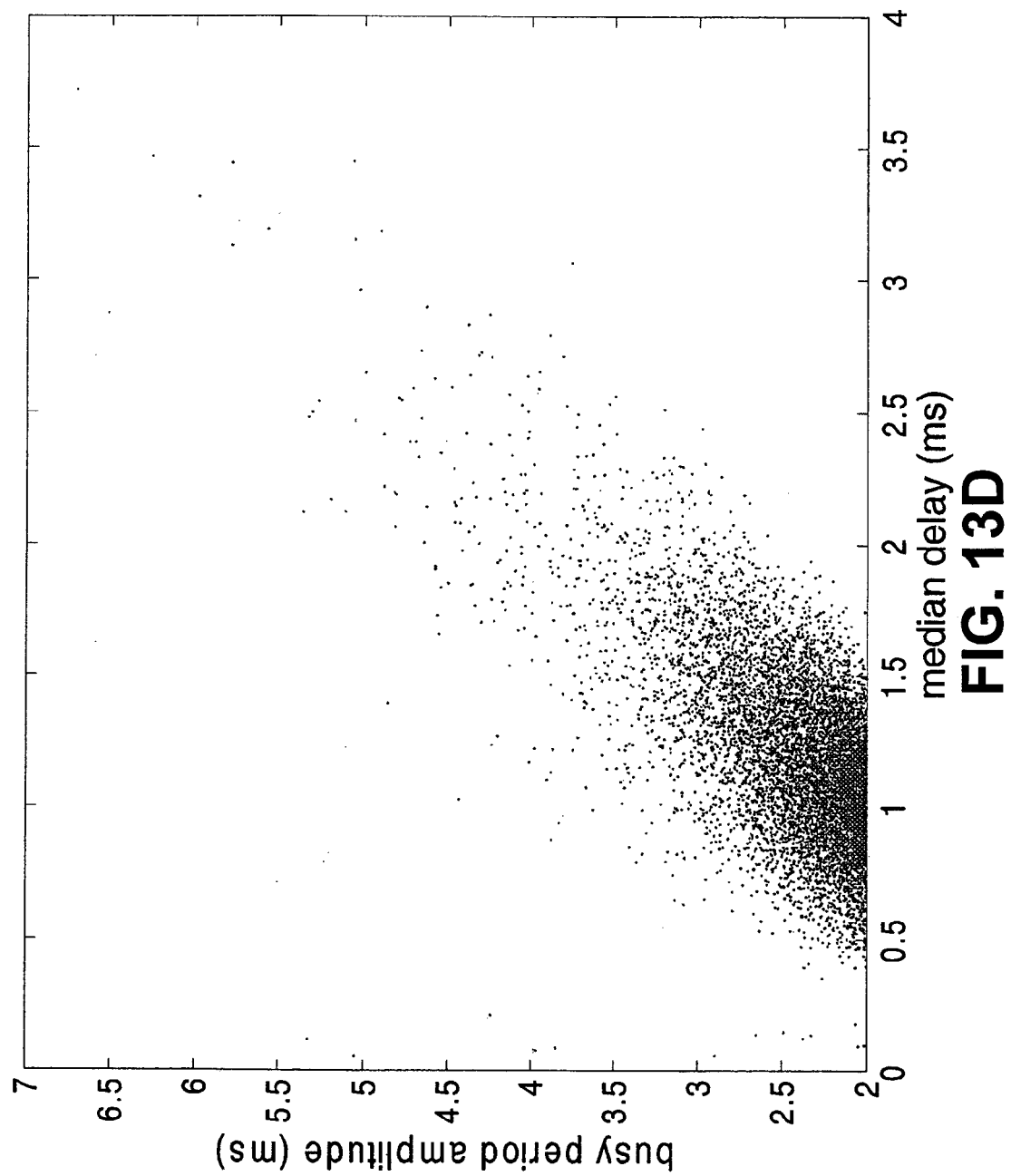
FIG. 13D is a scatter plot of busy period amplitudes against the median delay experienced by packets inside the busy period.

A scatter plot of busy period amplitudes against the median delay experienced by packets inside the busy period is presented in FIG. 13D. A linear, albeit noisy, relationship between maximum and median delay experienced by packets inside a busy period is apparent. This means intuitively that busy periods have a "regular" shape, i.e., busy periods where most of the packets experience small delays and only a few packets experience much larger delays are unlikely.

The full router measurements permit even further analysis into the characterization of busy periods. In particular, the knowledge obtained concerning the input packet streams on each interface may be used to understand the mechanisms that create the busy periods observed for the router output links. It is clear that, by definition, busy periods are created by a local aggregate arrival rate which exceeds the output link service rate. This can be achieved by a single input stream, the multiplexing of different input streams, or a combination of both phenomena. A detailed analysis can be found in *Origins of Microcongestion in an Access Router*, K. Papagiannaki et al., *Proc. Passive and Active Measurement Workshop*, Antibes, Juan Les Pins, France (2004), the disclosure of which is incorporated herein by reference in its entirety.

Figure 14A:
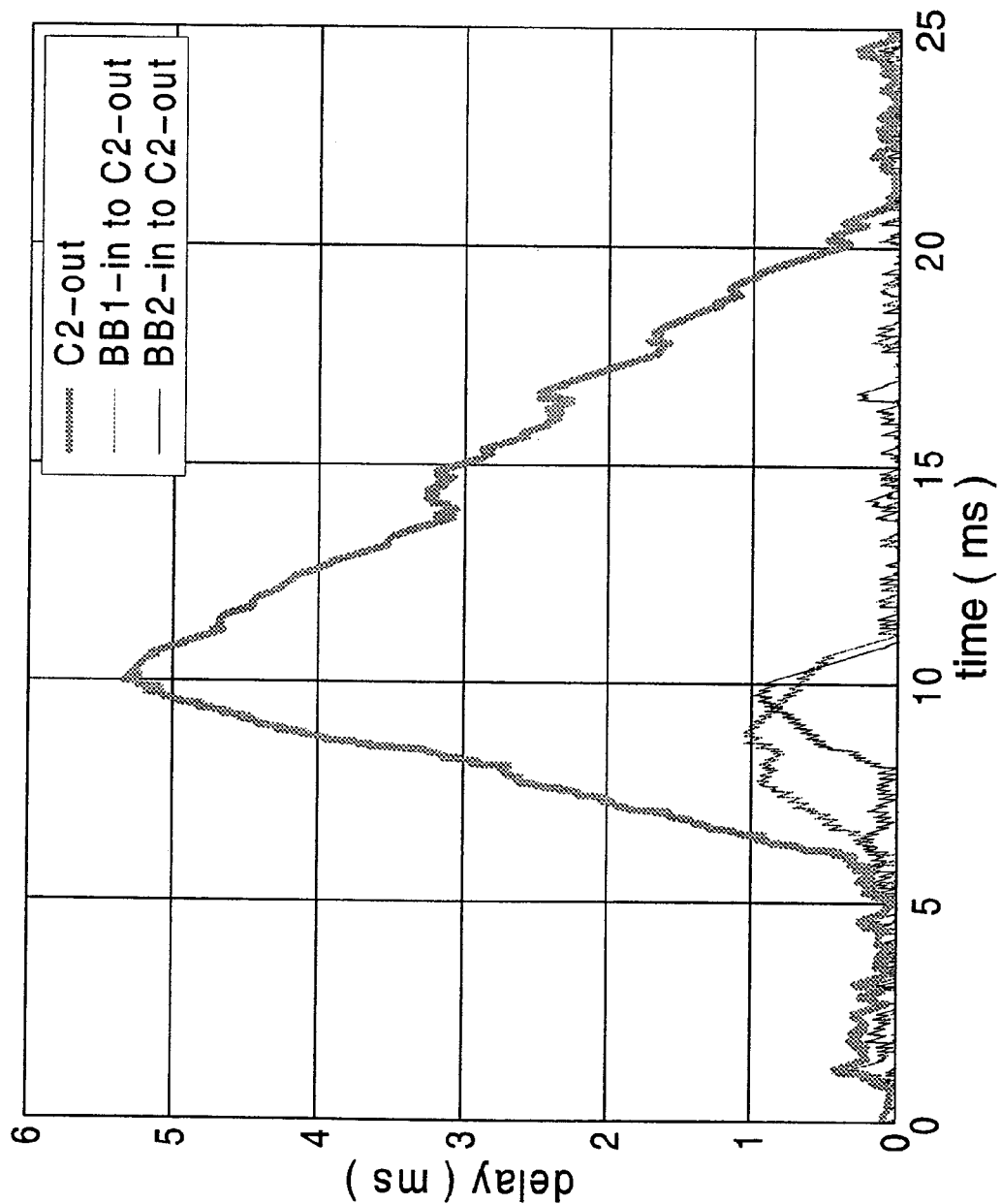
FIG. 14A is a graphical representation of the delays in the individual packet streams BB1-in to C2-out and BB2-in to C2-out, together with the true delays measured on link C2-out for the same time window as in FIG. 11A, wherein the maximum delay experienced by packets from each individual input stream is about 1 ms.
Figure 14B:
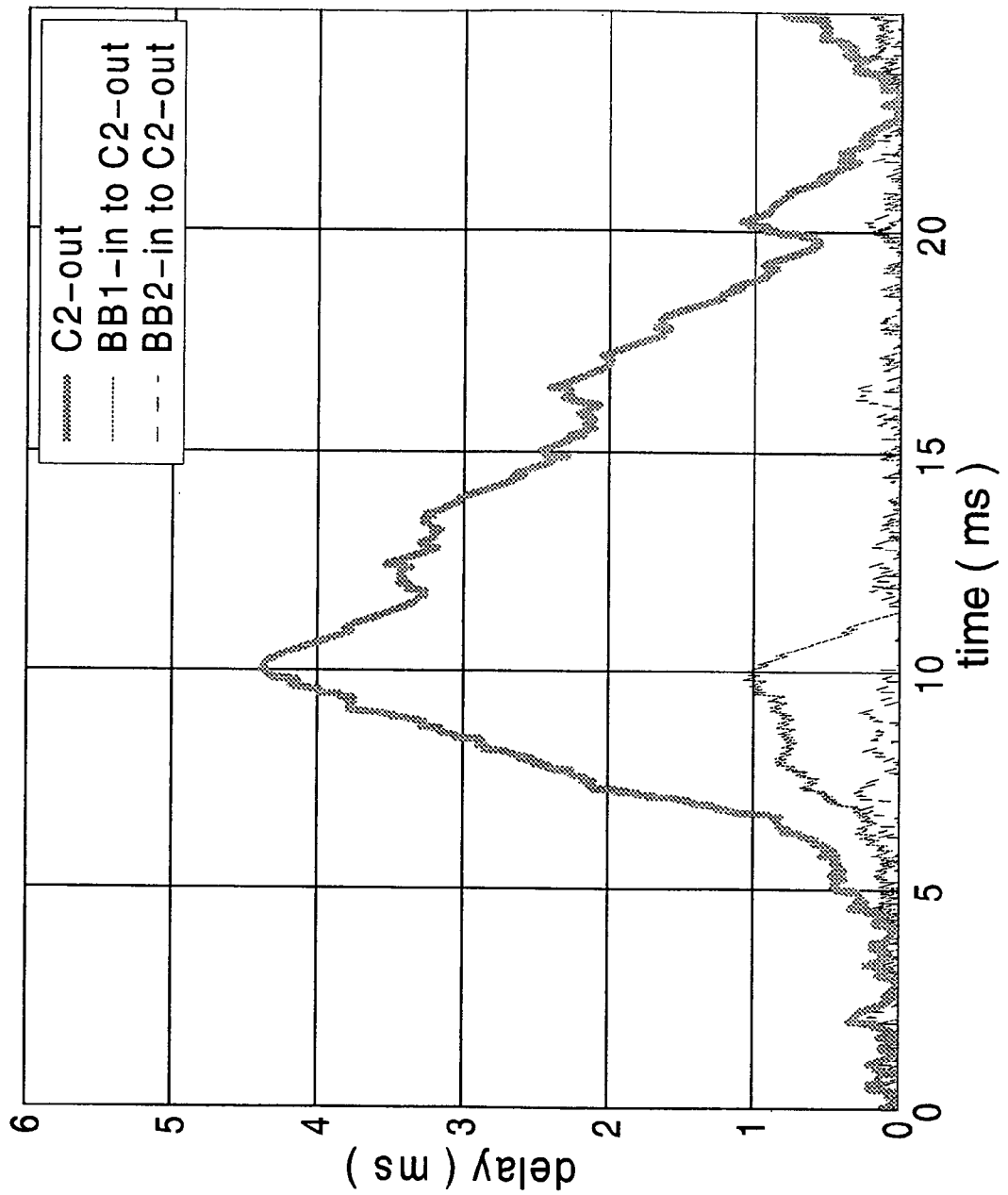
FIG. 14B is a graphical representation of the delays in the individual packet streams BB1-in to C2-out, together with the true delays measured on link C2-out for the same time window as in FIG. 11A, wherein one input stream (BB1-in to C2-out) creates at most about a 1 ms packet delay by itself and the other input stream (BB2-in to C2-out) a succession of about 200 µs delays.
Figure 14C:
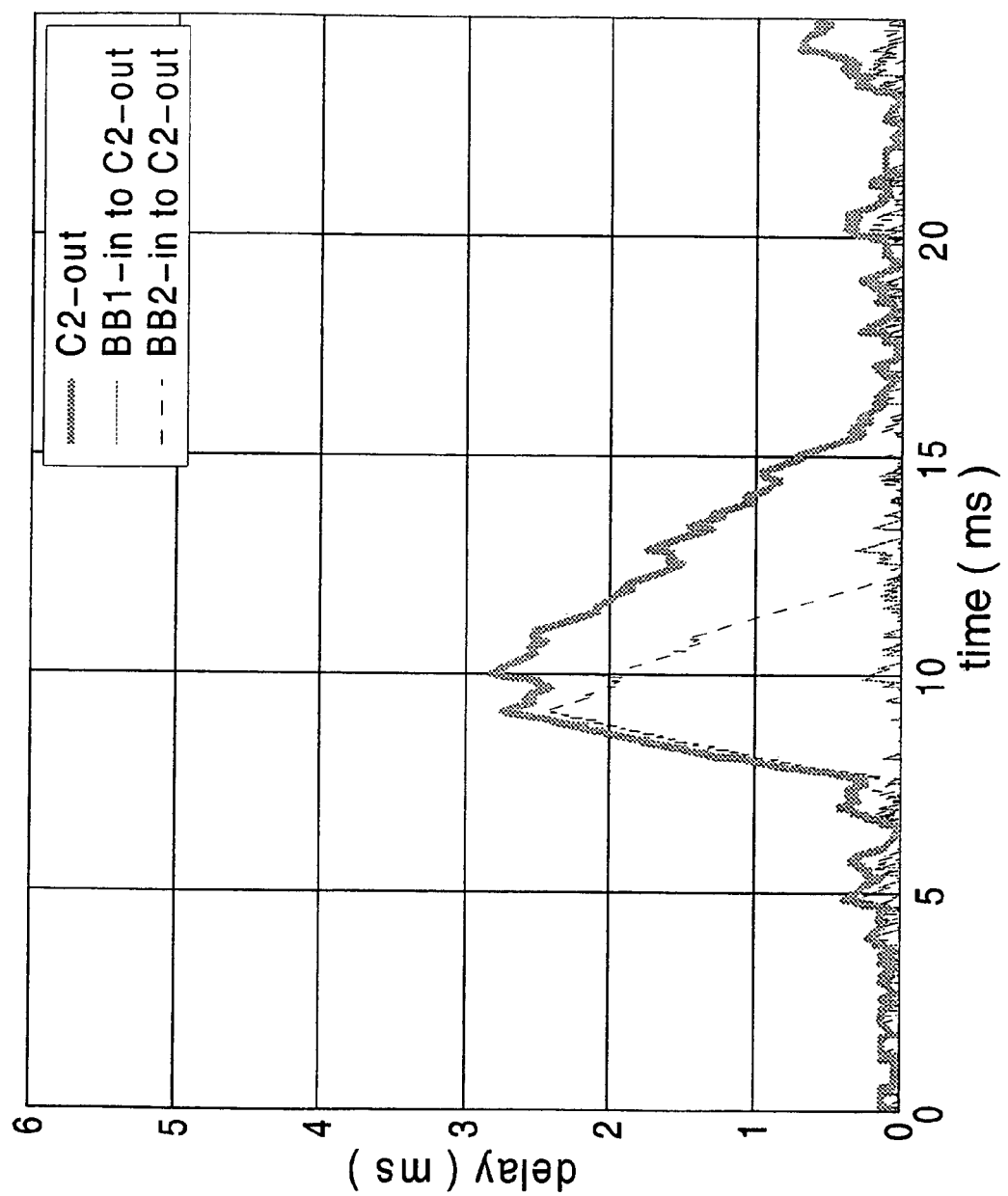
FIG. 14C is a graphical representation of the delays in the individual packet streams BB1-in to C2-out and BB2-in to C2-out, together with the true delays measured on link C2-out for the same time window as in FIG. 11A, wherein one input stream (BB2-in to C2-out) contributes virtually all the traffic of the output link for a short time period.

To create the busy periods shown in FIGS. 14A-14F, the individual packet streams BB1-in to C2-out and BB2-in to C2-out were stored, fed individually to the model and virtual busy periods were obtained. The delays obtained are plotted in FIG. 14A, together with the true delays measured on link C2-out for the same time window as in FIGS. 11A and 11B. In the absence of cross-traffic, the maximum delay experienced by packets from each individual input stream was around 1 ms. However, the largest delay for the multiplexed inputs was around 5 ms. The large busy period was therefore due to the fact that the delays of the two individual packet streams peaked at the same time. This non-linear phenomenon is the cause of all the large busy periods observed in the traces. A more surprising example is illustrated in FIG. 14B wherein it is illustrated that one input stream (BB1-in to C2-out) created at most about a 1 ms packet delay by itself and the other (BB2-in to C2-out) a succession of about 200 μs delays. The resulting congestion episode for the multiplexed inputs was again much larger than the individual episodes. A different situation is shown in FIG. 14C, wherein one link (BB2-in to C2-out) contributed almost all the traffic of the output link for a short time period. In this case, the measured delays were almost the same as the virtual ones caused by the busy input link.

Figure 14D:
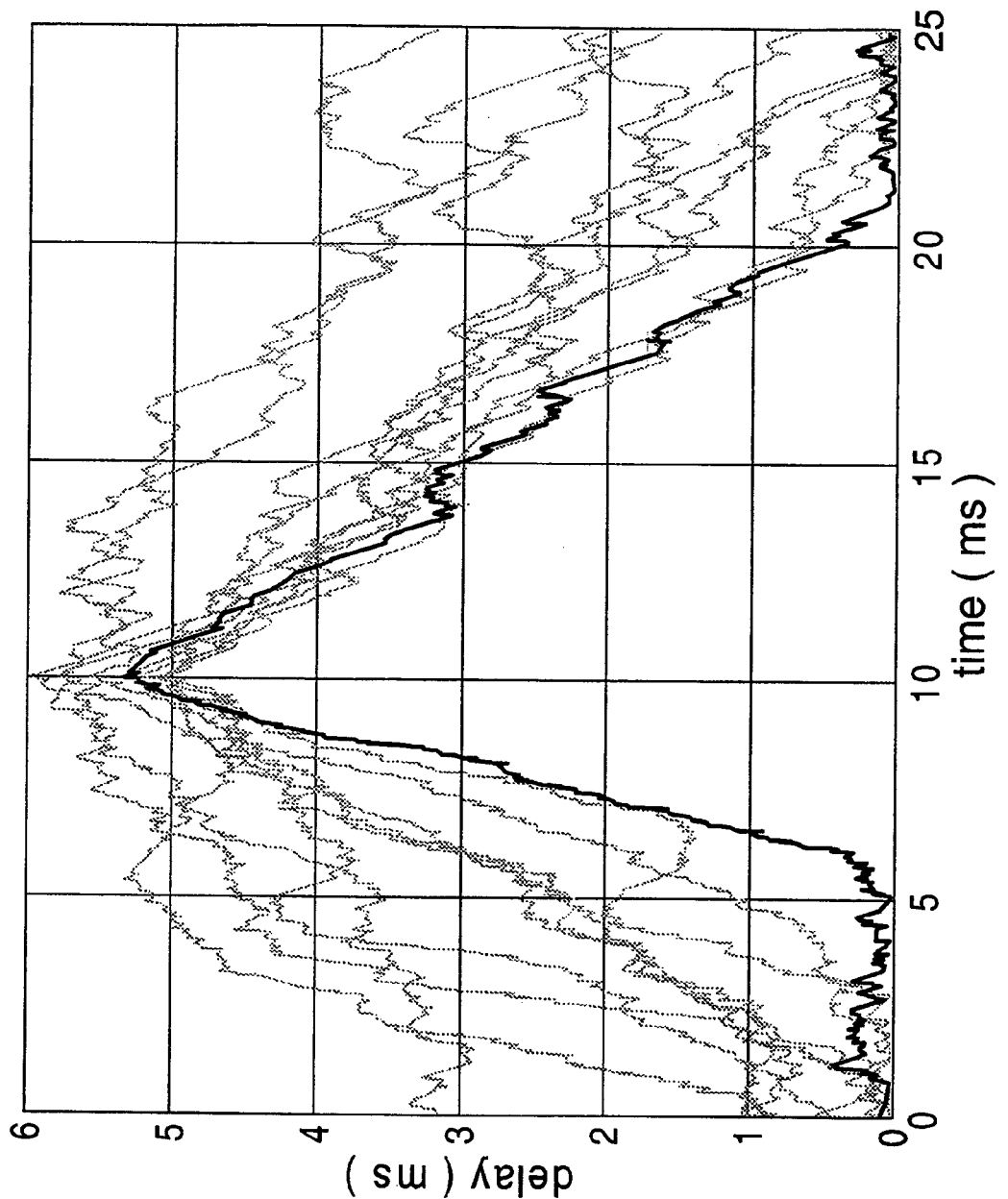
FIG. 14D is a graphical representation illustrating a collection of busy periods having maximum packet delays between about 5 ms and about 6 ms, the black line highlighting the busy period detailed in FIG. 14A.
Figure 14E:
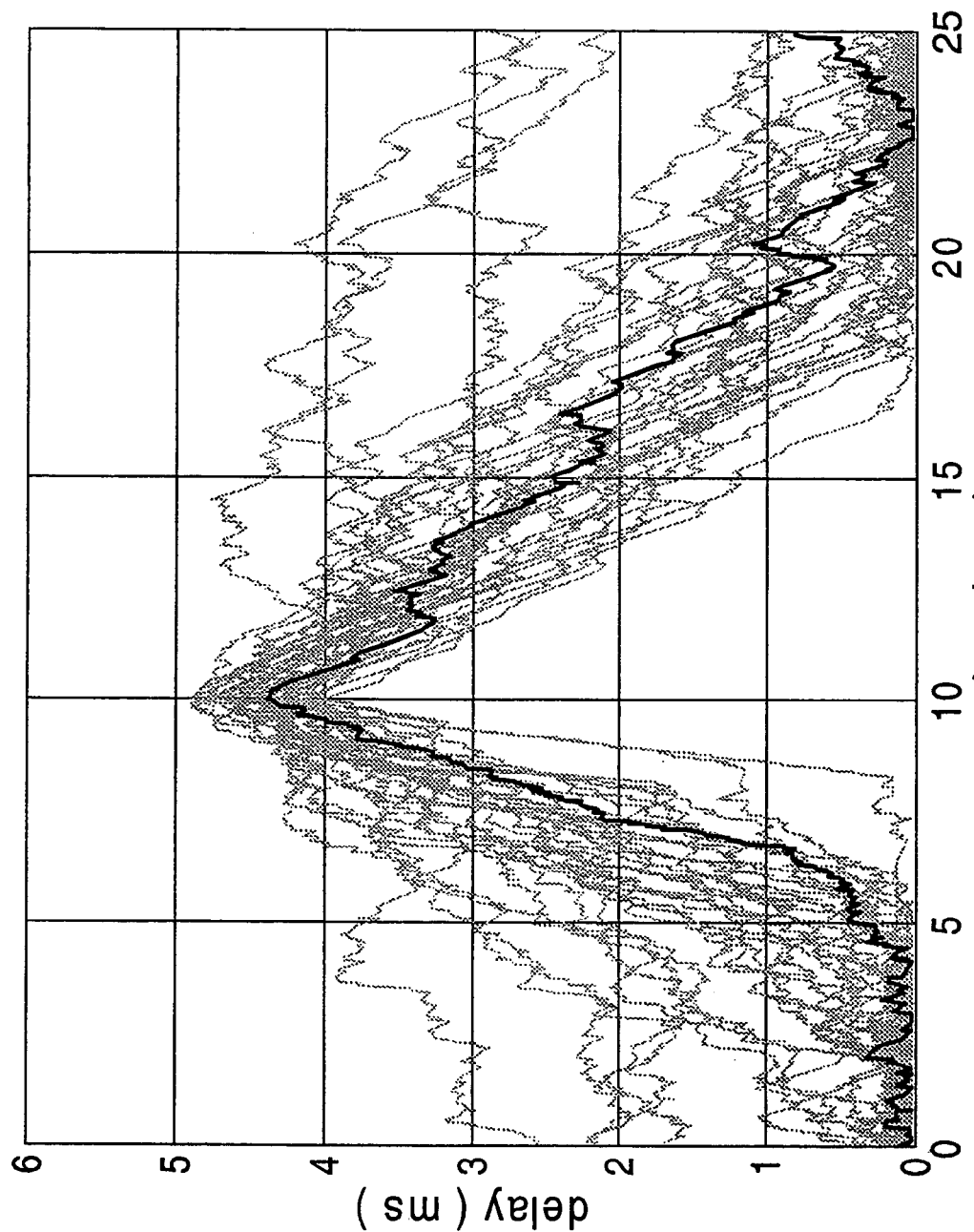
FIG. 14E is a graphical representation illustrating a collection of busy periods having maximum packet delays between about 4 ms and about 5 ms, the black line highlighting the busy period detailed in FIG. 14B.
Figure 14F:
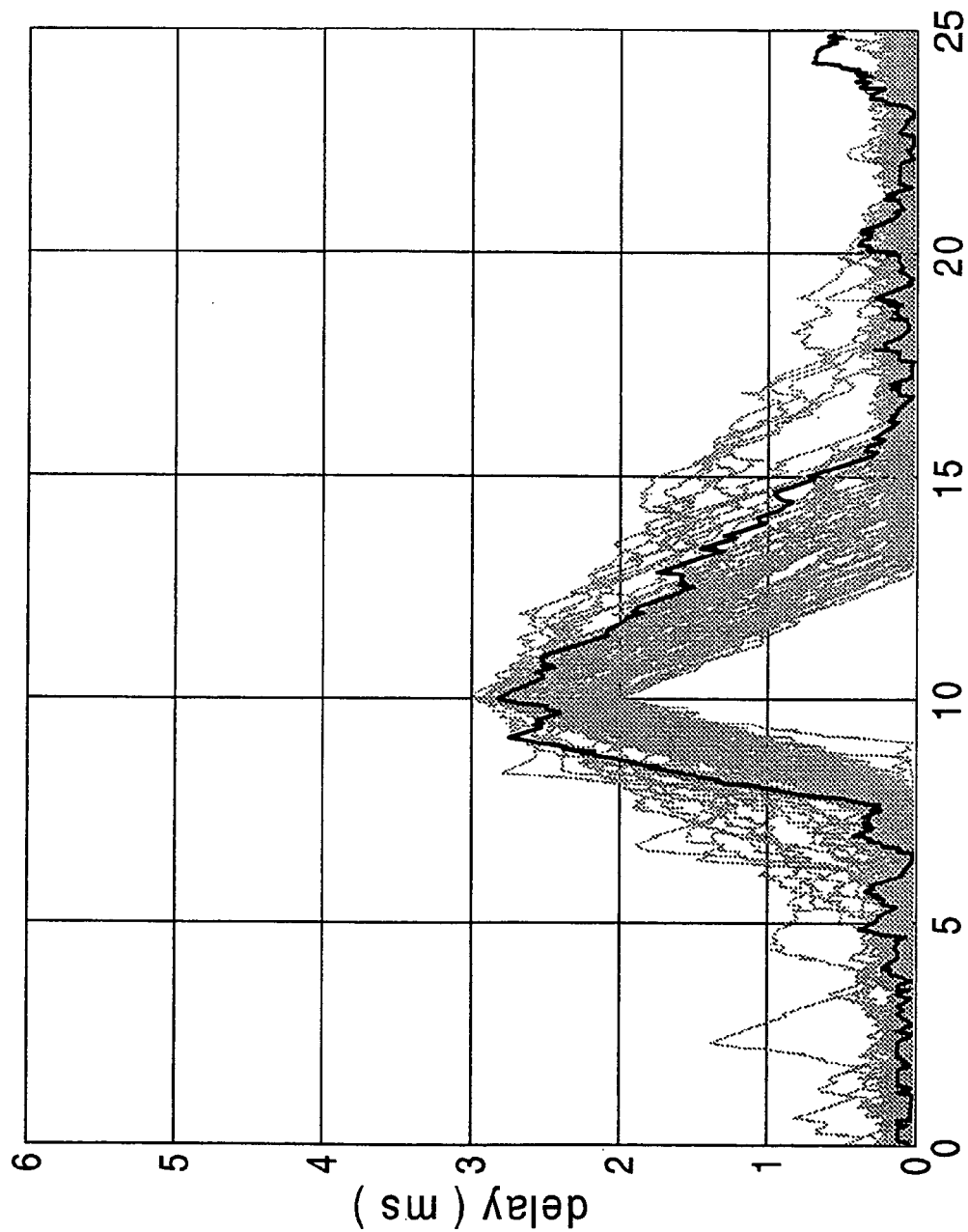
FIG. 14F is a graphical representation illustrating a collection of busy periods having maximum packet delays between about 2 ms and about 3 ms, the black line highlighting the busy period detailed in FIG. 14C.

It is interesting to note that the three large busy periods plotted in FIGS. 14A, 14B, and 14C all have a roughly triangular shape. FIGS. 14D, 14E, and 14F illustrate that this was not due to a particular choice of busy periods. The busy periods were obtained as follows: For each five minute interval, the largest packet delay was detected, the corresponding packet arrival time $t_0$ was stored, and the delays experienced by packets in a window 10 ms before and 15 ms after $t_0$ were plotted. The resulting sets of busy periods were grouped according to the largest packet delay observed. FIG. 14D illustrates a collection of busy periods having maximum packet delays between about 5 ms and about 6 ms. FIG. 14E illustrates a collection of busy periods having maximum packet delays between about 4 ms and about 5 ms. FIG. 14F illustrates a collection of busy periods having maximum packet delays between about 2 ms and about 3 ms. For each of the plots 14D, 14E and 14F, the black lines highlight the busy periods detailed in plots 14A, 14B, and 14C, respectively. The striking point is that most busy periods have a roughly triangular shape. The largest busy periods have slightly less regular shapes, but a triangular assumption can still hold.

These results are reminiscent of the theory of large deviations, which states that rare events happen in the most likely way. Some hints on the shape of large busy periods in (Gaussian) queues can be found in *Performance Formulae for Queues with Gaussian Input*, R. Addie et al., *Proc. 16th International Teletraffic Congress* (1999), the disclosure of which is incorporated herein by reference in its entirety. This reference shows that, in the limit of large amplitude, busy periods tend to be anti-symmetric about their midway point. This is in agreement with what was seen in the present examples.

Example 14

Modeling Busy Period Shape

Although a triangular approximation may seem very crude at first, such a model can be very useful. Consider the basic principle shown in FIG. 15. That is, any busy period of duration D seconds is bounded above (i.e., the theoretical bound) by the busy period obtained in the case where the D seconds worth of work arrive in the system at maximum input link speed. The amount of work then decreases with slope −1 if no more packets enter the system. In the case of the OC-3 link C2-out fed by the two OC-48 links BB1 and BB2 (each link being 16 times faster than C2-out), it takes at least D/32 seconds for the load to enter the system. From the measurements obtained, busy periods are quite different from their theoretical bound. The busy period shown in FIGS. 11A and 14A is again plotted in FIG. 15 for comparison. It is apparent that its amplitude, A, is much lower than the theoretical maximum, in agreement with the scatter plot of FIG. 13C.

Figure 15:
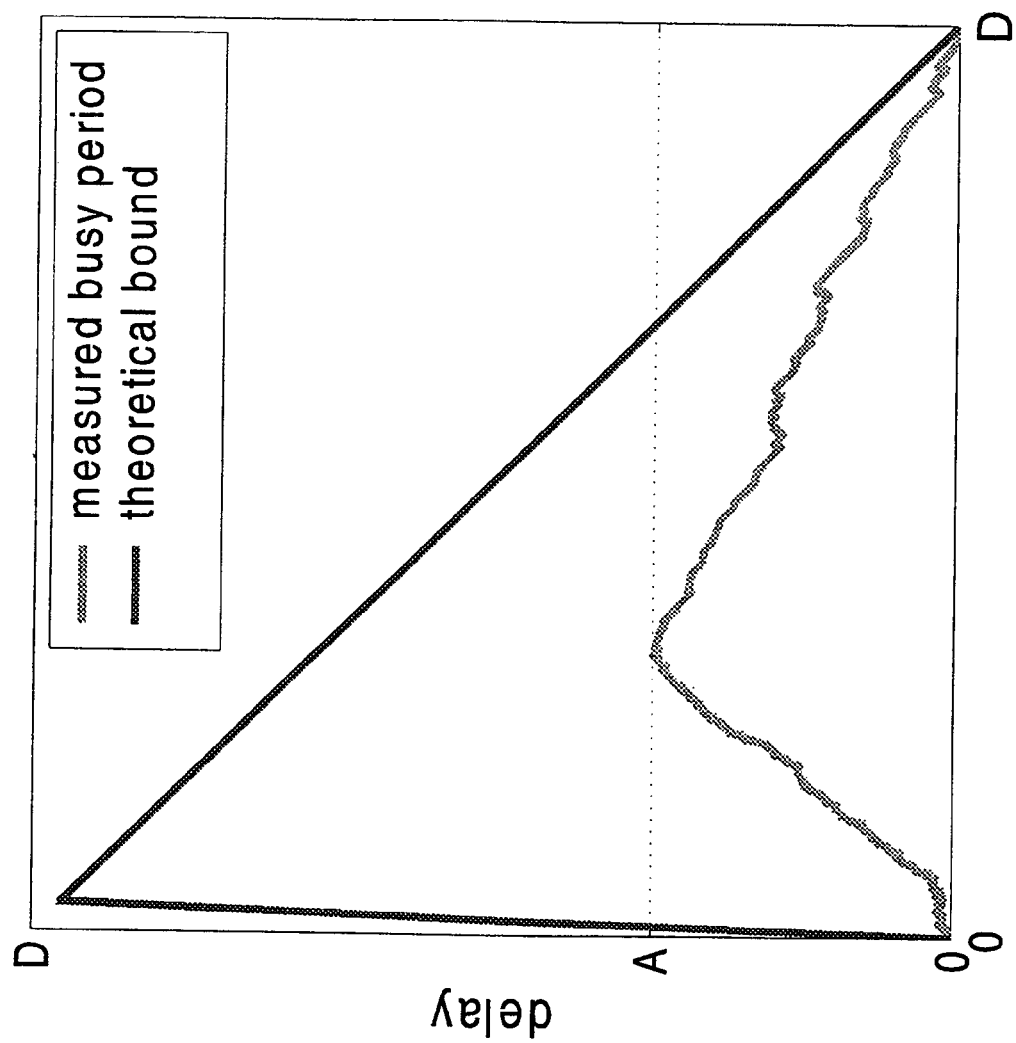
FIG. 15 is a schematic illustration of the shape of a modeled busy period of duration D and amplitude A in conjunction with a measured busy period.
Figure 16:
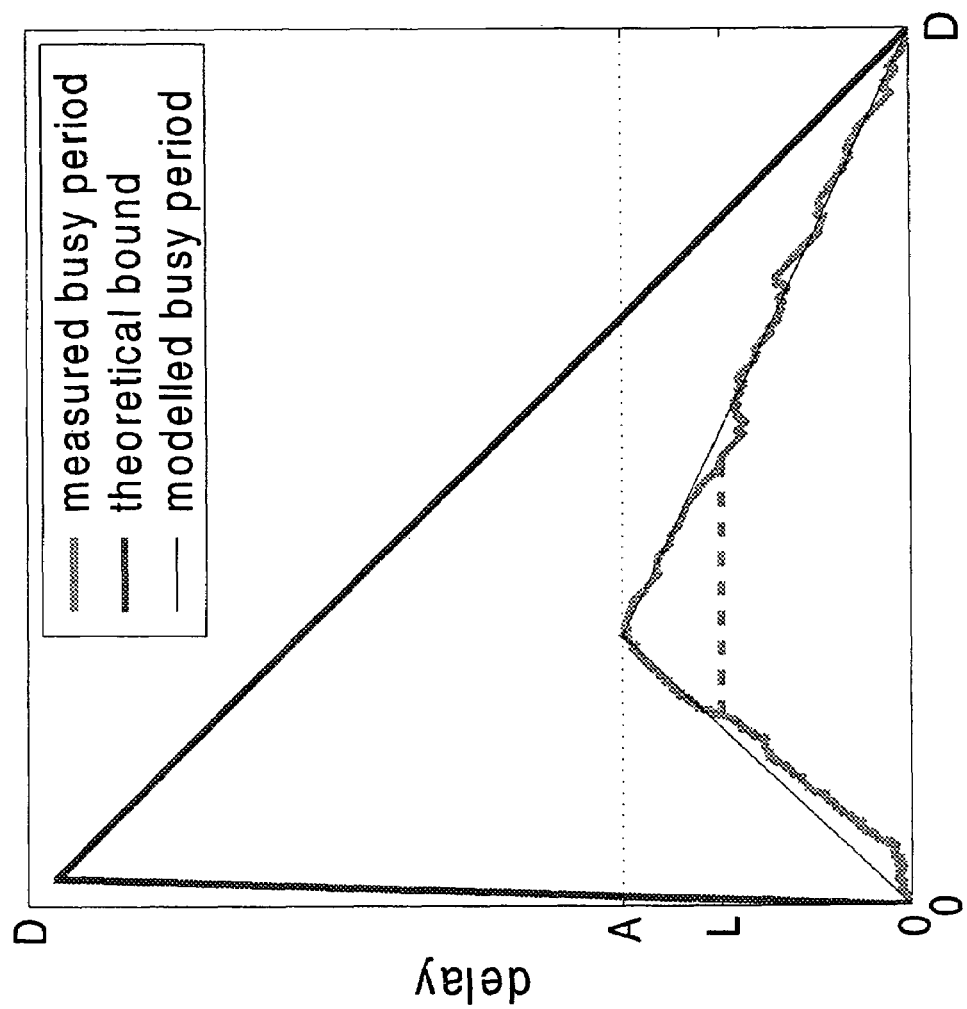
FIG. 16 is a schematic illustration of the modeled busy period of FIG. 15 with a triangle superimposed over the measured busy period.

For the remainder of the present discussion, the shape of a busy period of duration D and amplitude A is modeled by a triangle with base D, height A, and same apex position as the modeled busy period of FIG. 15. This is illustrated in FIG. 16 by the triangle superimposed over the measured busy period. This very rough approximation can give surprisingly valuable insight into packet delays. The performance metric may be defined as follows: Let L be the delay experienced by a packet crossing the router. A network operator might be interested in knowing how long a congestion level larger than L will last, because this gives a direct indication of the performance of the router.

Let $d_{L,A,D}$ be the length of time the workload of the system remains above L during a busy period of duration D and amplitude A, as obtained from the delay analysis. Let $d_{L,A,D}^{(T)}$ be the approximated duration obtained from the shape model. Both $d_{L,A,D}$ and $d_{L,A,D}^{(T)}$ are plotted with a dashed line in FIG. 16. From basic geometry, it can be shown that $$d_{L,A,D}^{(T)} = \begin{cases} D\left(1 - \frac{L}{A}\right) & \text{if } A \geq L \\ 0 & \text{otherwise} \end{cases}.$$

In other words, $d_{L,A,D}^{(T)}$ is a function of L, A, and D only. For the metric considered, the two parameters (A,D) are therefore enough to describe busy periods. Knowledge of the apex position does not improve the estimate of $d_{L,A,D}$.

Denote by $\Pi_{A,D}$ the random process governing {A,D} pairs for successive busy periods over time. The mean length of time during which packet delays are larger than L reads $$T_L = \int d_{L,A,D} d\Pi_{A,D} \cdot T_L$$

can be approximated by the busy period model with $$T_L^{(T)} = \int d_{L,A,D}^{(T)} d\Pi_{A,D}.$$

The equation $$T_L^{(T)} = \int d_{L,A,D}^{(T)} d\Pi_{A,D}$$

may be used to approximate $T_L$ on the link C2-out. The results are plotted on FIG. 17 for two five-minute windows of traffic with different average utilizations. For both utilization levels (ρ=0.3 and 0.7), the measured durations (solid line) and the results from the triangular approximation (dashed line) are fairly similar. This shows that the very simple triangular shape approximation captures enough information about busy periods to answer questions about duration of congestion episodes of a certain level. The small discrepancy between data and model can be considered insignificant in the context of Internet applications because a service provider will realistically only be interested in the order of magnitude (1 ms, 10 ms, 100 ms) of a congestion episode greater than L. The simple approach described herein therefore fulfills that role very well.

Figure 17:
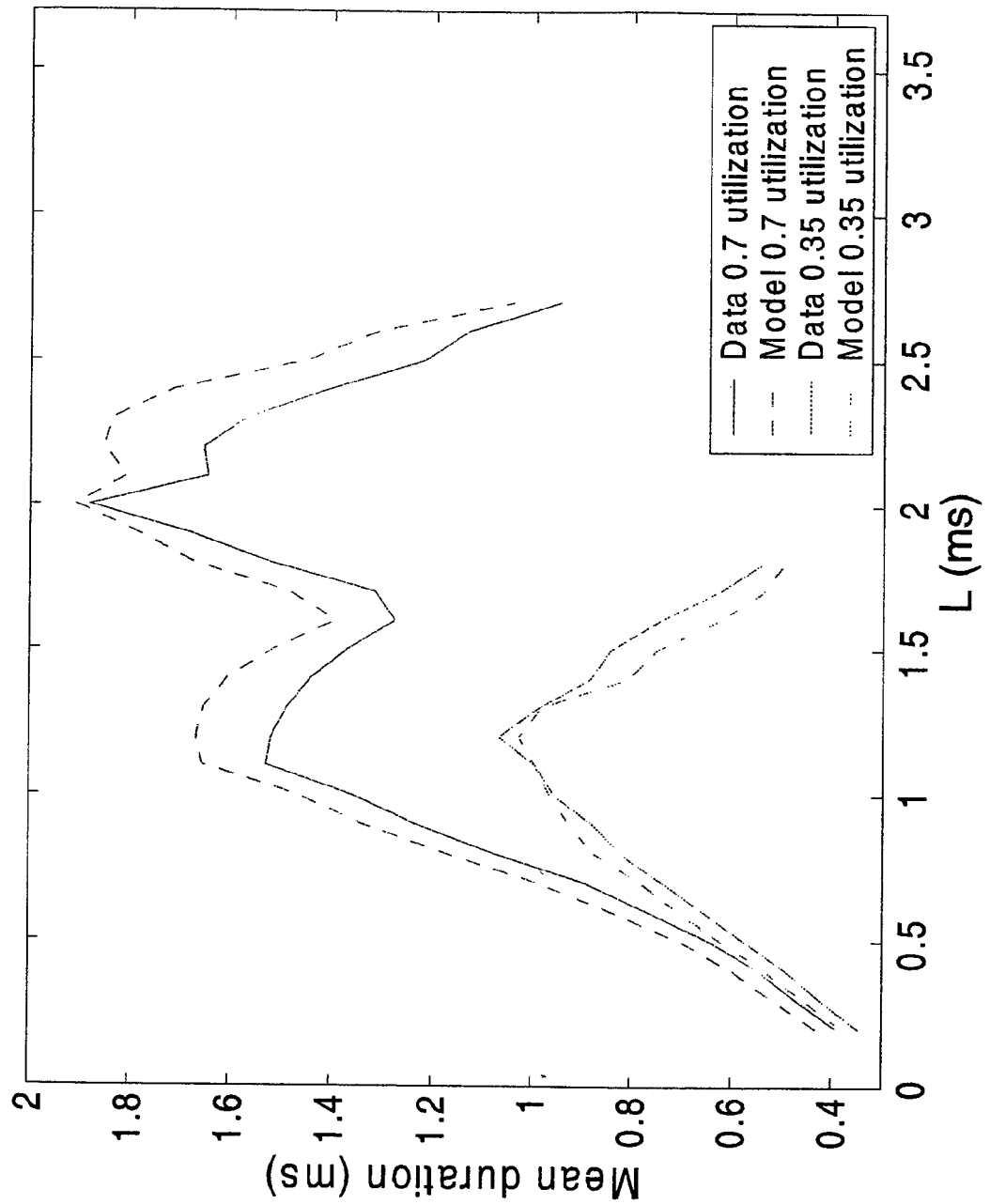
FIG. 17 is a graphical representation illustrating the average duration of a congestion episode greater than L ms for two different utilization levels ($\rho=0.3$ and 0.7) on link C2-out.

A qualitative description of the behaviors observed in FIG. 17 follows. For a small congestion level L, the mean duration of the congestion episode is also small. This is due to the fact that, although a large number of busy periods have an amplitude larger than L, as seen, for instance, from the amplitude CDF in FIG. 13A, most busy periods do not exceed L by a large amount, so the mean duration is small. It is also worth noting that the results are very similar for the two different link utilizations (ρ=0.3 and 0.7). This means that busy periods with small amplitude are roughly similar at this time scale and do not depend on average utilization.

As the threshold L increases, the (conditional on L) mean duration first increases as there are still a large number of busy periods with amplitude greater than L on the link, and of these, most are considerably larger than L. With even larger values of L however, fewer and fewer busy periods qualify. The ones that do cross the threshold L do so for increasingly smaller amounts of time, up to the point where there are no busy periods larger than L in the trace.

Example 15

Reporting Busy Period Statistics

The above-described examples illustrate that useful information may be obtained about delays by jointly using the amplitude and duration of busy periods. As more fully described below, such statistics also may be concisely reported using known protocols, e.g., Simple Network Management Protocol (SNMP).

Initially, busy periods were formed from the queue size values and (A,D) pairs were collected during five-minute intervals. This is feasible in practice since the queue size is already accessed by other software such as active queue management schemes. Measuring A and D is easily performed on-line. In principle, it is not necessary to report the pair (A,D) for each busy period in order to recreate the process $\Pi_{A,D}$ and evaluate $$T_L^{(T)} = \int d_{L,A,D}^{(T)} d\Pi_{A,D}.$$

Since this represents a very large amount of data in practice, it is instead assumed that busy periods are independent and therefore that the full process $\Pi_{A,D}$ can be described by the joint marginal distribution $F_{A,D}$ of A and D. Thus, for each busy period, it is necessary to simply update a sparse 2-D histogram. The bin sizes were selected as fine as possible consistent with available computing power and memory, a process not further discussed herein. The bin sizes are not critical since at the end of the five minute interval, a much coarser discretization is performed in order to limit the volume of data finally exported via SNMP. This is controlled directly by choosing N bins for each of the amplitude and the duration dimensions.

Figure 18:
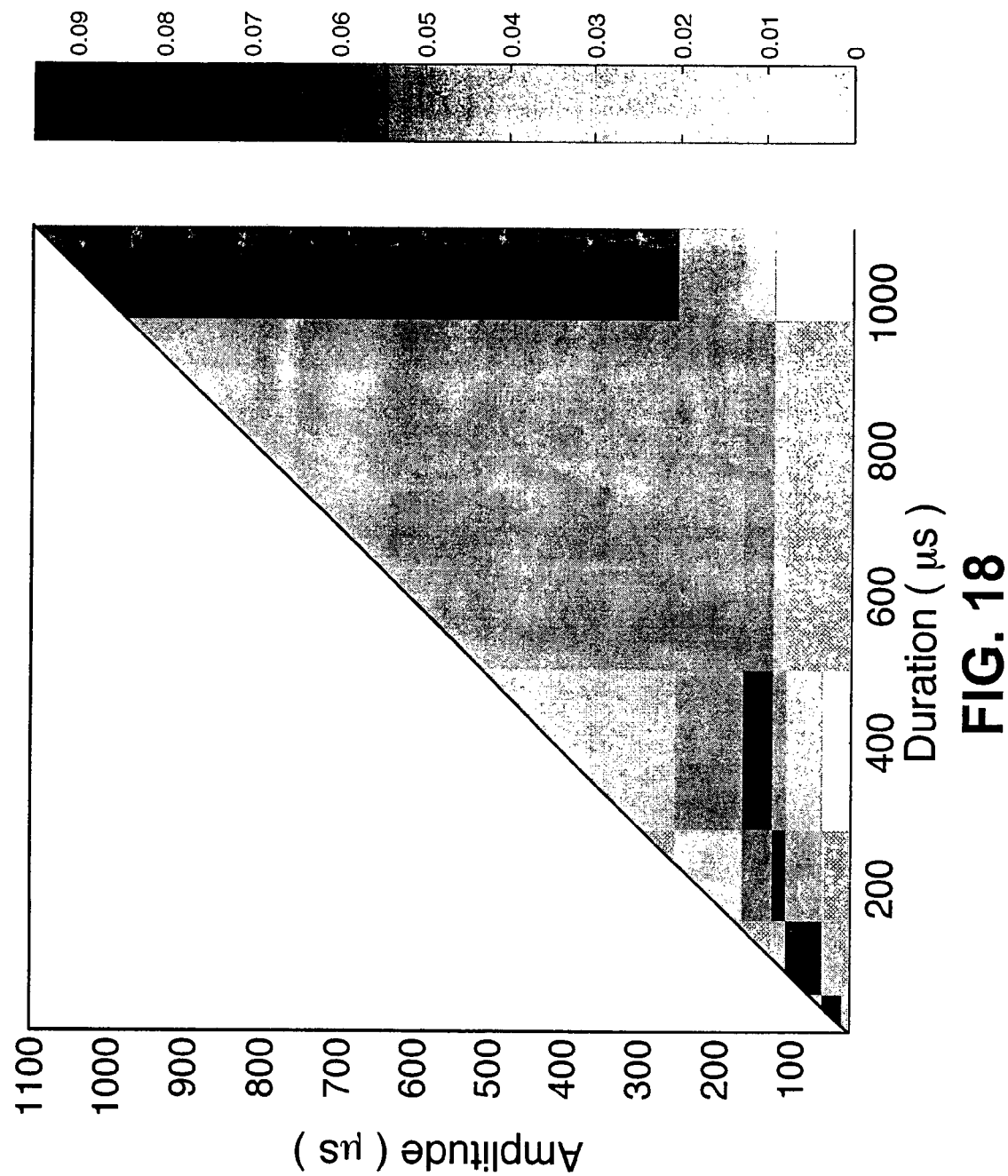
FIG. 18 is a graphical representation of a histogram of the quantized joint probability distribution of busy period amplitudes and durations with N=10 equally spaced quantiles along each dimension for a five-minute window on link C2-out.

As it is not known in advance what delay values are common, the discretization scheme must adapt to the traffic to be useful. A simple and natural way to do this is to select bin boundaries for D and A separately based on quantiles, i.e., on bin populations. For example, a simple equal population scheme for D would define bins such that each contained (100/N) % of the measured values. Denote by M the N×N matrix representing the quantized version of $F_{A,D}$. The element p (i,j) of M is defined as the probability of observing a busy period with duration between the $(i-1)^{th}$ and in duration quantile, and amplitude between the $(j-1)^{th}$ and $j^{th}$ amplitude quantile. Thus, for every busy period A<D, the matrix is triangular as shown in FIG. 18. Every five minutes, 2N bin boundary values for amplitude and duration, and $$\frac{N^2}{2}$$

joint probability values, were exported.

The 2-D histogram stored in M contains the 1-D marginals for amplitude and duration characterizing, respectively, packet delays and link utilization. In addition, however, from the 2-D histogram the relative frequencies of different busy period shapes are apparent. Using this richer information, together with a shape model, M may be used to answer performance related questions. Applying this to the measurement of $T_L$ introduced hereinabove, and assuming independent busy periods, $$T_L^{(T)} = \int d_{L,A,D}^{(T)} d\Pi_{A,D}$$

becomes $$T_L^{(T)} = \int d_{L,A,D}^{(T)} dF_{A,D} = \int_{A>L} D\left(1 - \frac{L}{A}\right) dF_{A,D}.$$

To evaluate this, a single representative amplitude $A_i$ and average duration $D_j$ for each quantized probability density value p (i,j), (i,j)∈{1, ..., N}² was determined from M. In practice, for instance, the center of gravity of each of the tiles plotted in FIG. 18 may be chosen. For a given level L, the average duration $T_L$ was then estimated by $$T_L^{(\tilde{T})} = \frac{1}{n_L} \sum_{j=1}^{N} \sum_{\substack{i=1 \\ A_i>L}}^{j} d_{L,A_i,D_j}^{(T)} p(i, j),$$

where $n_L$ is the number of pairs $(A_i,D_j)$ such that $A_i>L$. Estimates obtained from $$T_L^{(\tilde{T})} = \frac{1}{n_L} \sum_{j=1}^{N} \sum_{\substack{i=1 \\ A_i>L}}^{j} d_{L,A_i,D_j}^{(T)} p(i, j)$$

are plotted in FIG. 17. They are fairly close to the measured durations despite the strong assumption of independence.

Although very simple and based on a rough approximation of busy period shapes, this reporting scheme can give some interesting information about the delay performance of a router. In the examples described herein, it has only been illustrated how $T_L$ could be approximated with the reported busy period information, but other performance-related questions may be answered in the same way. In any case, the reporting scheme provides a much more valuable insight about packet delays than prior art statistics based on average link utilization. Moreover, it is only based on measurements and is therefore traffic independent.

In summary, the present invention provides a detailed exploration of through-router delays. In this regard, a unique experimental setup is provided wherein all IP packets crossing a Tier-1 access router may be captured and authoritative empirical results about packet delays presented. Subsequently, the obtained dataset may be used to provide a physical model of router delay performance, which model very accurately can infer packet delays. Additionally, the present invention provides a valuable understanding of delay performance. In this regard, measured statistics of router busy periods are provided in addition to a simple triangular shape model that permits the capture and presentation of useful delay information. A scheme to export router delay performance in a compact way is also provided.

The present invention and its equivalents are well-adapted to provide a method for measuring and reporting delay in routers as well as a method for analyzing performance of a network. The present invention has been described in relation to particular embodiments which are intended in all respects to be illustrative rather than restrictive. Alternative embodiments will become apparent to those of ordinary skill in the art and do not depart from its scope.

It will be understood that certain features and subcombinations are of utility and may be employed without reference to other features and subcombinations and are contemplated to be within the scope of the claims.

The invention claimed is:

1. A method for analyzing performance of a communications network, comprising:
    measuring a packet-size-dependent minimum delay through at least one routing device in the communications network, the packet-size-dependent minimum delay being experienced by a packet, wherein the packet-size-dependent minimum delay includes an amount of time that elapses during which the routing device makes a forwarding decision, divides the packet into cells, transmits the packet across a switching fabric, reassembles the packet, and delivers the packet to an output queue,
      1) wherein the amount of time is based in-part on a first timestamp that is created prior to every byte of the packet entering an input interface, in addition to, a duration of time required to finish transferring every byte of the first packet into the input interface, and
      (2) wherein the amount of time is also based in-part on a second timestamp that is created prior to every byte of the packet fully exiting an output interface, in addition to, a duration of time required to finish transferring every byte of the first packet out of the output interface; and
    reporting the packet-size-dependent minimum delay, wherein reporting comprises exporting information describing the packet-size-dependent minimum delay using network protocols.

2. The method of claim 1, wherein the communications network comprises a data network.

3. The method of claim 1, wherein the at least one routing device comprises a router.

4. The method of claim 3, wherein the router is comprised of a store-and-forward router architecture.

5. The method of claim 1, wherein the at least one routing device includes at least one output queue and wherein determining the packet-size dependent minimum delay for the at least one packet comprises determining a minimum time for the at least one routing device to process the at least one packet and forward the at least one packet to the at least one output queue.

6. The method of claim 1, further comprising determining an output queue delay that describes an amount of time that an output queue serves the packet.

7. The method of claim 6, wherein a through-router delay is determined by adding the packet-size-dependent minimum delay and the output queue delay.

8. The method of claim 1, wherein the at least one routing device includes at least one output link extending therefrom and including a link transport protocol and a physical layer and wherein measuring the delay through that at least one routing device further comprise determining a value of a service rate for the at least one output link taking into account the link transport protocol and the physical layer.

9. The method of claim 1, wherein the at least one routing device includes at least one output queue and wherein measuring the delay through the at least one routing device comprises:
measuring a total number of bytes in that at least one output queue; and
using the measured total number of bytes as a surrogate for the delay.

10. The method of claim 9, wherein the at least one routing device further includes at least one output link extending therefrom, wherein the at least one output queue is a First In First Out output queue, and wherein output from the at least one output queue to the at least one output link is fluid.

11. The method of claim 1, wherein reporting the measured delay comprises reporting the measured delay using Simple Network Management Protocol.

12. A method for analyzing performance of a communications network, the communications network including at least one router, the method comprising:
gathering information relating to a plurality of through-router delays, each through-router delay of the plurality of through-router delays both being experienced by a respective and describing a duration of time required for the respective to travel through the at least one router, wherein the plurality of through-router delays describes at least one packet-congestion episode, and wherein the at least one packet-congestion episode comprises time elapsed between arrival of a packet in system that is empty and return of the system to an empty state; and
communicating the gathered information, wherein communicating the gathered comprises exporting the gathered information using network protocols.

13. The method of claim 12, wherein the communications network comprises a data network.

14. The method of claim 12, wherein the at least one router comprises a store-and-forward router architecture.

15. The method of claim 12, wherein gathering information comprises:
measuring a duration of the at least one packet congestion episode;
measuring an amplitude of the at least one packet congestion episode; and
jointly storing the duration and the amplitude.

16. The method of claim 12, wherein gathering information relating to a plurality of through-router delays comprises gathering information relating to a plurality of congestion episodes.

17. The method of claim 16, wherein gathering information comprises:
measuring a duration for each of the plurality of congestions episodes;
measuring an amplitude for each of the plurality of congestion episodes; and
jointly storing the duration and amplitude for each of the plurality of congestion episodes.

18. The method of claim 17, further comprising:
inputting the duration for each of the plurality of congestion episodes into a first plurality of bins, each of the first plurality of bins including an equal population of congestion episode durations; and
inputting the amplitude for each of the plurality of congestion episodes into a second plurality of bins, each of the second plurality of bins including an equal population of congestion episode amplitudes.

19. The method of claim 18, further comprising:
determining a single representative value for each bin of the first plurality of bins and for each bin of the second plurality of bins; and
generating a joint probability distribution using the representative values.

20. The method of claim 12, wherein gathering information relating to a plurality of through-router delays comprises determining a packet-size dependent minimum delay for each of the plurality of packets.

21. The method of claim 20, wherein the at least one router includes at least one output queue and wherein determining the packet-size dependent minimum delay for each of the plurality of packets comprises determining a minimum time for the at least one router to process each of the plurality of packets and forward each of the plurality of packets to the at least one output queue.

22. The method of claim 21, wherein the at least one router includes at least one output link extending therefrom and including a link transport protocol and a physical layer and wherein gathering information relating to through-router delays further comprises determining a value of a service rate for the at least one output link taking into account the link transport protocol and the physical layer.

23. A method for analyzing performance of a communications network, comprising:
measuring delay through at least one routing device in the communications network, the delay being experienced by at least one packet, wherein the measured delay through the at least one routing device is time it takes the at least one packet to travel through the at least one routing device and wherein measuring comprises:
(1) measuring a packet-size dependent minimum delay for the at least one packet, wherein measuring a packet-size dependent minimum delay comprises measuring a minimum time for the at least one routing device to process the at least one packet and forward the at least one packet to at least one output queue;
(2) measuring an output queue delay for the at least one packet; and
(3) adding the packet-size dependent minimum delay and the output queue delay;
reporting the measured delay, wherein reporting the measured delay comprises exporting information describing the delay using network protocols;
gathering information relating to through-router delays, the through-router delays being experienced by a plurality of packets, wherein the gathered information comprises information relating to at least one packet congestion episode comprising time elapsed between arrival of a packet in a system and return of the system to an empty state and wherein the gathered information relating to at least one packet congestion episode comprises duration of the at least one packet congestion episode; and communicating the gathered information, wherein communicating the gathered information comprises exporting the gathered information using network protocols.

24. A method for analyzing performance of a communications network, the method comprising:

measuring a first through-router delay that is experienced by a first packet traveling through a routing device,
- (1) wherein the first through-router delay includes a duration of time between a first instant in time at which every byte of the first packet has fully entered an input interface of the routing device and a second instant in time at which every byte of the first packet has fully exited an output interface of the at least one routing device,
- 2) wherein the first instant in time is based in-part on a first timestamp that is created prior to every byte of the first packet entering the input interface, in addition to, a duration of time required to finish transferring every byte of the first packet into the input interface, and
- (3) wherein the second instant in time is based in-part on a second timestamp that is created prior to every byte of the first packet fully exiting the output interface, in addition to, a duration of time required to finish transferring every byte of the first packet out of the output interface; and reporting the first through-router delay, wherein reporting comprises exporting information describing the first through-router delay using network protocols.

25. The method of claim 24, wherein the duration of time required to finish transferring every byte of the first packet into the input interface is based in-part on a number of bytes that are remaining to be transferred into the input interface, in addition to, a first link bandwidth; and wherein the duration of time required to finish transferring every byte of the first packet out of the output interface is based in-part on a number of bytes that are remaining to be transferred out of the output interface, in addition to, a second link bandwidth.

26. The method of claim 24, wherein the first through-router delay comprises:

a packet-size-dependent minimum delay, which includes an amount of time that elapses during which the routing device makes a forwarding decision, divides the first packet into cells, transmits the first packet across a switching fabric, reassembles the first packet, and delivers the first packet to an output queue; and an output queue delay that describes an amount of time that an output queue serves the first packet.

27. The method of claim 24, wherein the first packet enters the routing device at a time in which an output queue of the routing device is empty;

wherein a second packet enters the routing device while the first packet is still being served by the output queue; and wherein the first through-router delay is used to determine a second through-router delay that is experienced by the second packet.

28. A method for analyzing performance of a communications network, which includes a router, the method comprising:

measuring a plurality of through-router delays, each of which describes a duration of time between a first instant in time at which every byte of a respective packet has fully entered an input interface of the router and a second instant in time at which every byte of the respective packet has fully exited an output interface of the router;

based on the plurality of through-router delays, identifying a congestion episode, which includes a time elapsed between arrival of a first packet in system that is empty and return of the system to an empty state, wherein the congestion episode includes both an amplitude, which includes a maximum through-router delay experienced by any packet during the congestion episode, and a duration;

identifying a through-router delay that is of interest; and based on the through-router delay that is of interest, in combination with the amplitude and duration of the congestion episode, determining how long a congestion level larger than a the through-router delay that is of interest will last on average.

29. A method for analyzing performance of a communications network, which includes a router, the method comprising:

defining a first plurality of bins that include durations of congestion episodes, wherein the first plurality of bins is divided into equal populations;

defining a second plurality of bins that include amplitudes of congestion episodes, wherein the second plurality of bins is divided into equal populations;

measuring a plurality of through-router delays, each of which describes a duration of time between a first instant in time at which every byte of a respective packet has fully entered an input interface of the router and a second instant in time at which every byte of the respective packet has fully exited an output interface of the router;

based on the plurality of through-router delays, identifying a plurality of congestion episodes, each of which includes a time elapsed between arrival of a first packet in system that is empty and return of the system to an empty state, wherein each congestion episode includes both an amplitude, which includes a maximum through-router delay experienced by any packet during the congestion episode, and a duration;

inputting the duration of each congestion episode into the first plurality of bins and determining a representative value to describe each bin of the first plurality of bins;

inputting the amplitude of each congestion episode into the second plurality of bins and determining a representative value to describe each bin of the second plurality of bins; and using the representative values to generate a joint probability distribution of congestion episode amplitudes and durations.

* * * * *